United States Patent [19]
Yamada

[11] Patent Number: 5,973,804
[45] Date of Patent: Oct. 26, 1999

[54] COLOR IMAGE PROCESSING APPARATUS CAPABLE OF DETECTING A COLOR OR MONOCHROMATIC IMAGE

[75] Inventor: Masanori Yamada, Kawasaki, Japan

[73] Assignee: Canon Kabushiki Kaisha, Tokyo, Japan

[21] Appl. No.: 08/280,803

[22] Filed: Jul. 26, 1994

Related U.S. Application Data

[63] Continuation-in-part of application No. 07/999,545, Dec. 31, 1992, abandoned, which is a continuation of application No. 07/561,183, Aug. 1, 1990, abandoned.

[30] Foreign Application Priority Data

| Aug. 2, 1989 | [JP] | Japan | 1-200490 |
| Aug. 2, 1989 | [JP] | Japan | 1-200494 |
| Aug. 2, 1989 | [JP] | Japan | 1-200497 |

[51] Int. Cl.$^6$ .................................................. G06K 9/00
[52] U.S. Cl. ............................................................ 358/538
[58] Field of Search .................................. 358/500, 515, 358/537, 538

[56] References Cited

U.S. PATENT DOCUMENTS

| 4,538,182 | 8/1985 | Saito et al. | 358/538 |
| 4,646,144 | 2/1987 | Ishida et al. | 358/75 |
| 4,692,796 | 9/1987 | Yamada et al. | 358/75 |
| 4,812,874 | 3/1989 | Kubota et al. | 355/7 |
| 4,896,208 | 1/1990 | Moriya et al. | 358/75 |
| 4,899,227 | 2/1990 | Yamada | 358/452 |
| 4,907,286 | 3/1990 | Yamada | 382/51 |
| 4,922,349 | 5/1990 | Abe et al. | 358/75 |
| 4,931,860 | 6/1990 | Narumiya | 358/75 |
| 4,953,012 | 8/1990 | Abe | 358/75 |
| 4,953,013 | 8/1990 | Tsuji et al. | 358/75 |
| 4,980,760 | 12/1990 | Hiratsuka et al. | 358/538 |
| 5,016,096 | 5/1991 | Matsunawa et al. | 358/538 |
| 5,031,050 | 7/1991 | Chan | 358/75 |
| 5,032,904 | 7/1991 | Murai et al. | 358/75 |
| 5,140,411 | 8/1992 | Haneda et al. | 358/75 |

FOREIGN PATENT DOCUMENTS

| 57-44825 | 3/1982 | Japan . |
| 61-223756 | 10/1986 | Japan . |
| 62-150966 | 7/1987 | Japan . |
| 64-76053 | 3/1989 | Japan . |
| 01236770 | 9/1989 | Japan . |
| 01277230 | 11/1989 | Japan . |
| 01110677 | 4/1990 | Japan . |

*Primary Examiner*—Jose L. Couso
*Attorney, Agent, or Firm*—Fitzpatrick, Cella, Harper & Scinto

[57] ABSTRACT

A color image processing apparatus which processes an original image data line-by-line. The color image processing apparatus includes a detector for detecting a portion in a line where an original image exists. In accordance with an output of the detector, a line-by-line determination is made as to whether the original image is a color image or a monochromatic image. The apparatus further includes a processor for processing the image of the original image in accordance with the result of the determination.

26 Claims, 41 Drawing Sheets

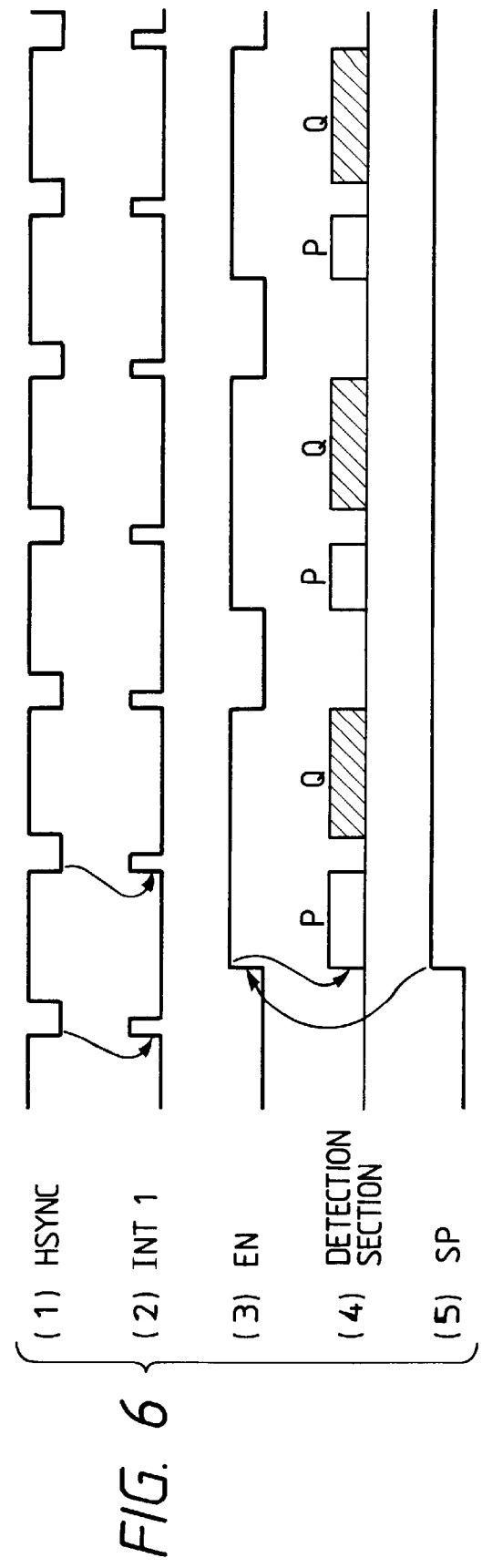

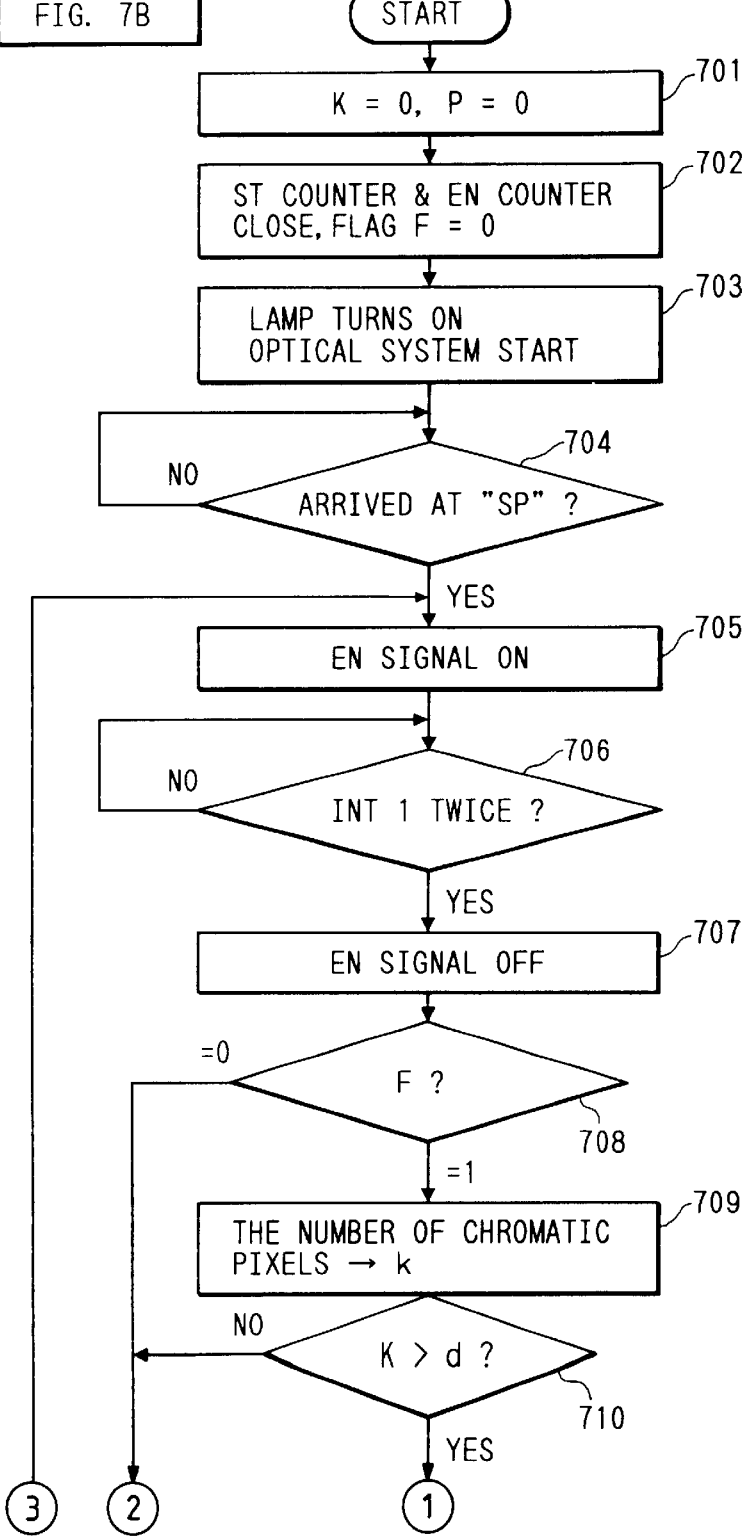

<AREA COORDINATE TABLE>

| MAIN SCAN | SUBSCAN |
|-----------|---------|
| $x_0$ | $y_0$ |
| $x_1$ | $y_1$ |
| $x_2$ | $y_2$ |
| ⋮ | ⋮ |
| $x_i$ | $y_i$ |
| ⋮ | ⋮ |
| $x_N$ | $y_N$ |

INPUT ORDER

FIG. 11

<LINE SEGMENT TABLE>

| LINE SEGMENT $L_0$ TABLE |
|---|
| LINE SEGMENT $L_1$ TABLE |
| LINE SEGMENT $L_2$ TABLE |
| ⋮ |
| LINE SEGMENT $L_i$ TABLE |
| ⋮ |
| LINE SEGMENT $L_N$ TABLE |

< LINE SEGMENT $L_i$ TABLE >

| LINE SEGMENT START SUBSCAN COORDINATE $Y_{Si}$ |
|---|
| LINE SEGMENT END SUBSCAN COORDINATE $Y_{Ei}$ |
| LINE SEGMENT START MAIN SCAN COORDINATE $X_{Si}$ |
| LINE SEGMENT SLOPE INTEGER PART $K_i$ |
| LINE SEGMENT SLOPE FRACTION PART DENOMINATOR $DY_i$ |
| LINE SEGMENT SLOPE FRACTION PART NUMERATOR $DX_i$ |
| LINE SEGMENT SLOPE ARITHMETIC OPERATION BUFFER $EX_i$ |
| PROCESSING COORDINATE BUFFER $X_{B0i}$ |
| PROCESSING COORDINATE BUFFER $X_{B1i}$ |
| PROCESSING CONTENT $T_i$ |

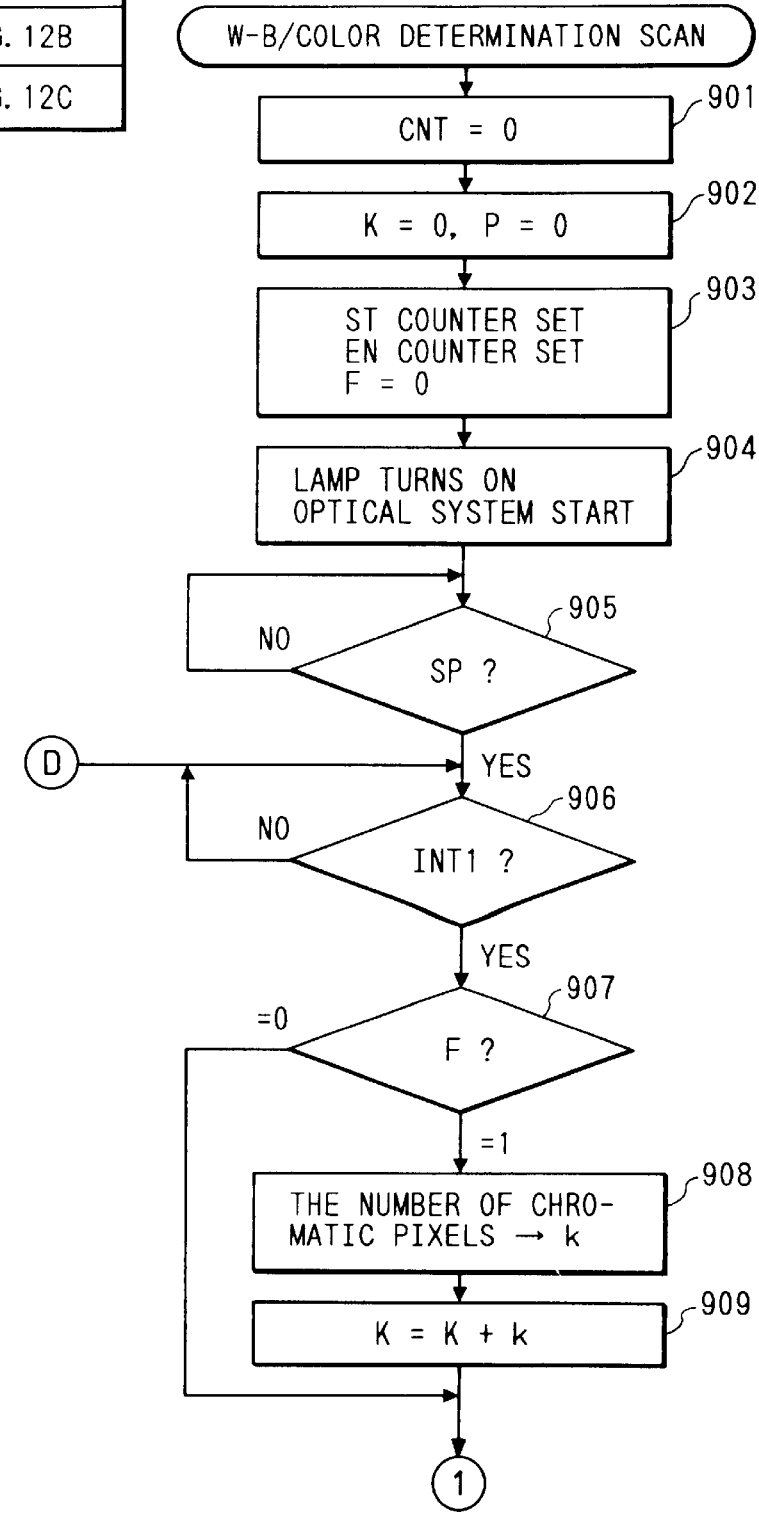

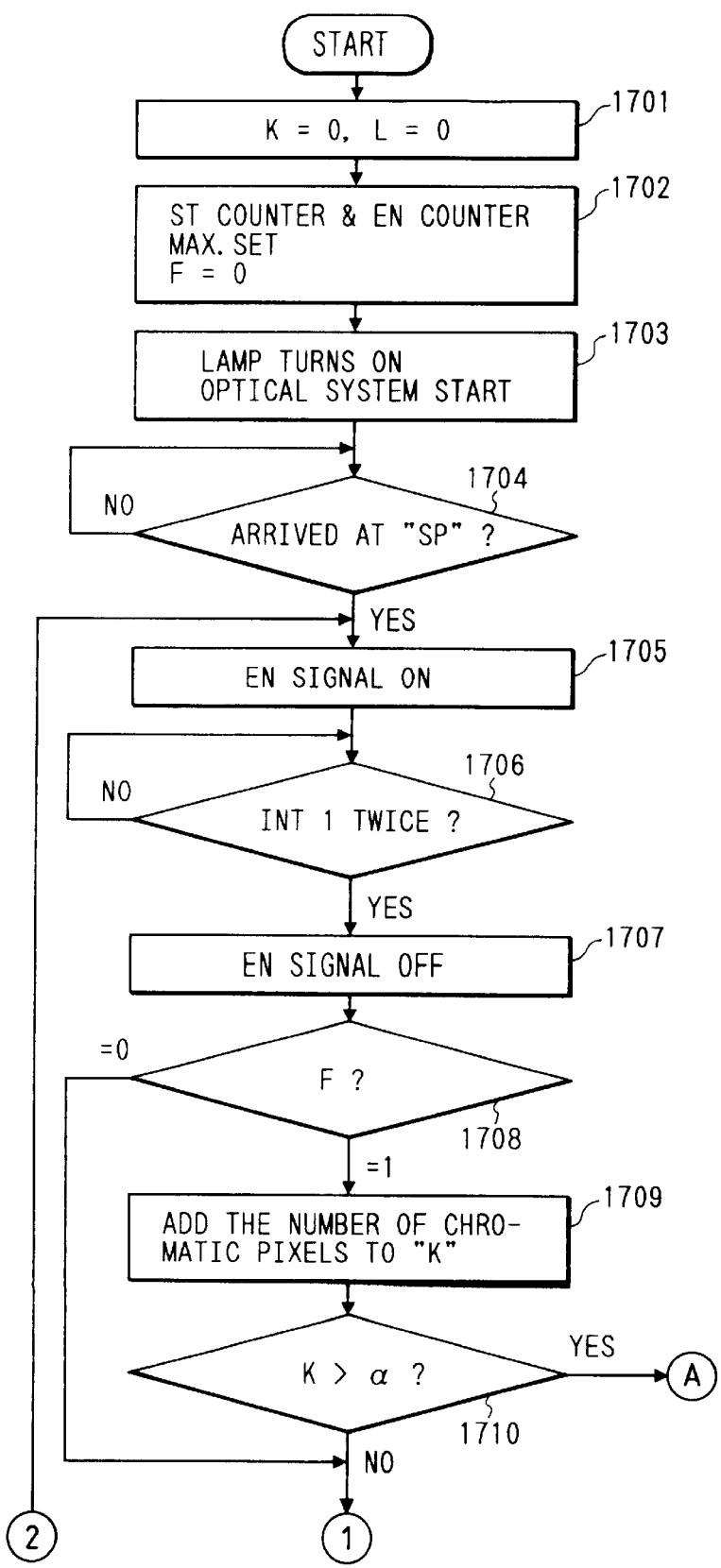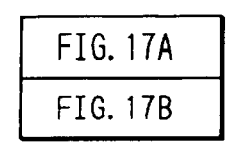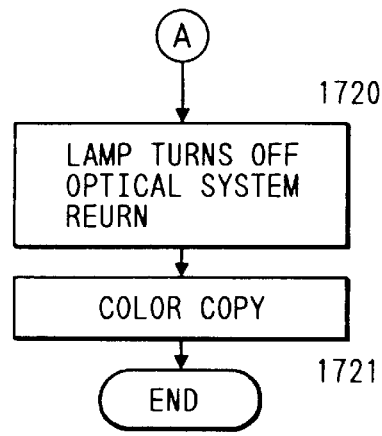

| FIG. 21A |
| FIG. 21B |
| FIG. 21C |

| TABLE ADDRESS | SUBSCAN COORDINATE | AREA NUMBER | START/END | DETERMINATION SECTION | |
|---|---|---|---|---|---|
| 0 | $Y_{S1}$ | 1 | 0 | $X_{S1}$ | $X_{E1}$ |
| 1 | $Y_{S2}$ | 2 | 0 | $X_{S2}$ | $X_{E2}$ |
| 2 | $Y_{S3}$ | 3 | 0 | $X_{S3}$ | $X_{E3}$ |
| 3 | $Y_{E2}$ | 2 | 1 | — | — |
| 4 | $Y_{S4}$ | 4 | 0 | $X_{S4}$ | $X_{E4}$ |
| 5 | $Y_{E3}$ | 3 | 1 | — | — |
| 6 | $Y_{E1}$ | 1 | 1 | — | — |
| 7 | $Y_{E4}$ | 4 | 1 | — | — |

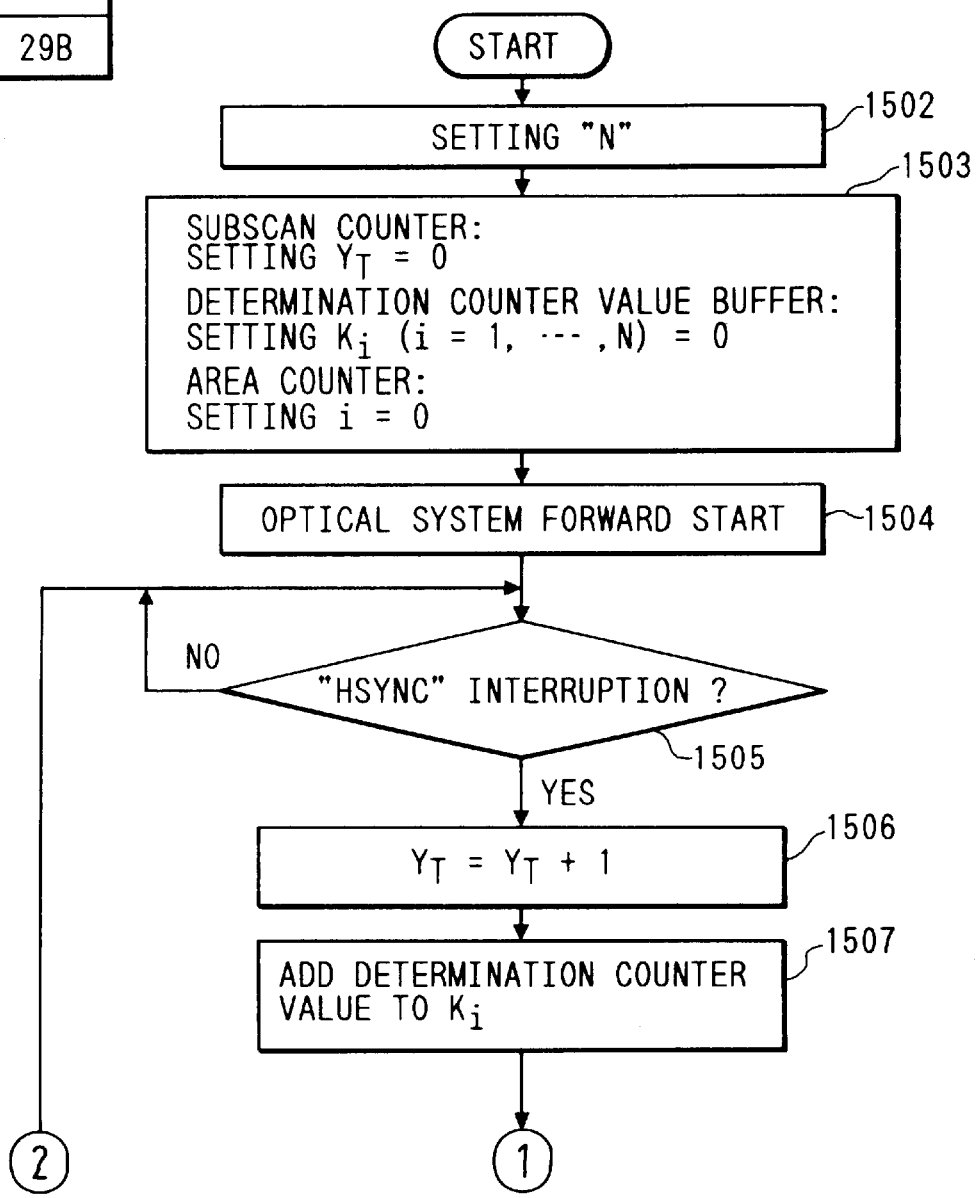

COLOR IMAGE PROCESSING APPARATUS CAPABLE OF DETECTING A COLOR OR MONOCHROMATIC IMAGE

This application is a continuation-in-part continuation of application Ser. No. 07/999,545 filed Dec. 31, 1992, now abandoned, which was a continuation of application Ser. No. 07/561,183, filed Aug. 1, 1990, now abandoned.

BACKGROUND OF THE INVENTION

1. Field of the Invention

The present invention relates to a color image processing apparatus, and more particularly to a color image processing apparatus capable of automatically discriminating whether the original image is a black-and-white original or a color original.

2. Related Background Art

The present applicant already proposed, for example in the U.S. patent applications Ser. No. 271,362 (now U.S. Pat. No. 4,953,012 issued Aug. 28, 1990) and Ser. No. 416,587, (now abandoned) a technology for use in a color copying apparatus, for automatically discriminating whether the original image is a black-and-white original or a color original, and executing black monochromic copying in case of a black-and-white original, or color copying with four colors of yellow, magenta, cyan and black in case of a color original. This technology allows to reduce the copying time and the copying cost.

However such conventional technology is incapable of exact discrimination for originals or areas of undefinite shape, because the discrimination is conducted over the entire area of the original.

Also in a structure in which the original image is pre-scanned prior to the image reading and the black monochromic copying or color copying is conducted according to the result of discrimination conducted on the output of said pre-scanning, the pre-scanning occupies a consideration portion of the operating time and deteriorates the efficiency of operation, particularly in case of handling plural original documents with an automatic document feeder, because the pre-scanning is conducted over the entire area of the original.

Also since the discrimination is conducted over the entire area of the original, in case of dividedly copying an original containing both a color image and a black-and-white image, reduction in the copying time or the copying cost cannot be achieved because a color process is conducted also on the black-and-white image.

SUMMARY OF THE INVENTION

In consideration of the foregoing, an object of the present invention is to achieve discrimination of a black-and-white original image or a color original image in efficient and precise manner.

Another object of the present invention is to achieve satisfactory discrimination of color or black-and-white image in an original or an area thereof of an arbitrary shape.

Still another object of the present invention is to achieve satisfactory discrimination of color or black-and-white image in each of plural originals or plural image areas.

Still another object of the present invention is to achieve secure discrimination of color or black-and-white image without waste in time.

The foregoing and still other objects of the present invention, and the advantages thereof, will become fully apparent from the following description.

BRIEF DESCRIPTION OF THE DRAWINGS

FIG. 6 is a timing chart of the first embodiment;

FIGS. 8-1, 8-2, 10 and 11 are charts showing a second embodiment;

FIGS. 14-1, 14-2, 14-3 and 14-4 are schematic views showing the principle of a fourth embodiment;

FIGS. 16-1, 16-2, 16-3 and 16-4 are schematic views showing the principle of a fifth embodiment;

FIGS. 20-1 and 20-2 are schematic views of a sixth embodiment;

FIGS. 22-1 and 22-2 are schematic views of an expansion of the sixth embodiment;

FIGS. 23-1 and 23-2 are schematic views of a seventh embodiment;

FIGS. 27-1 and 27-2 are schematic views of the eighth embodiment;

FIGS. 30-1, 30-2, 31-1, 31-2 and 31-3 are schematic views of a tenth embodiment.

DESCRIPTION OF THE PREFERRED EMBODIMENTS

Figure 2A:
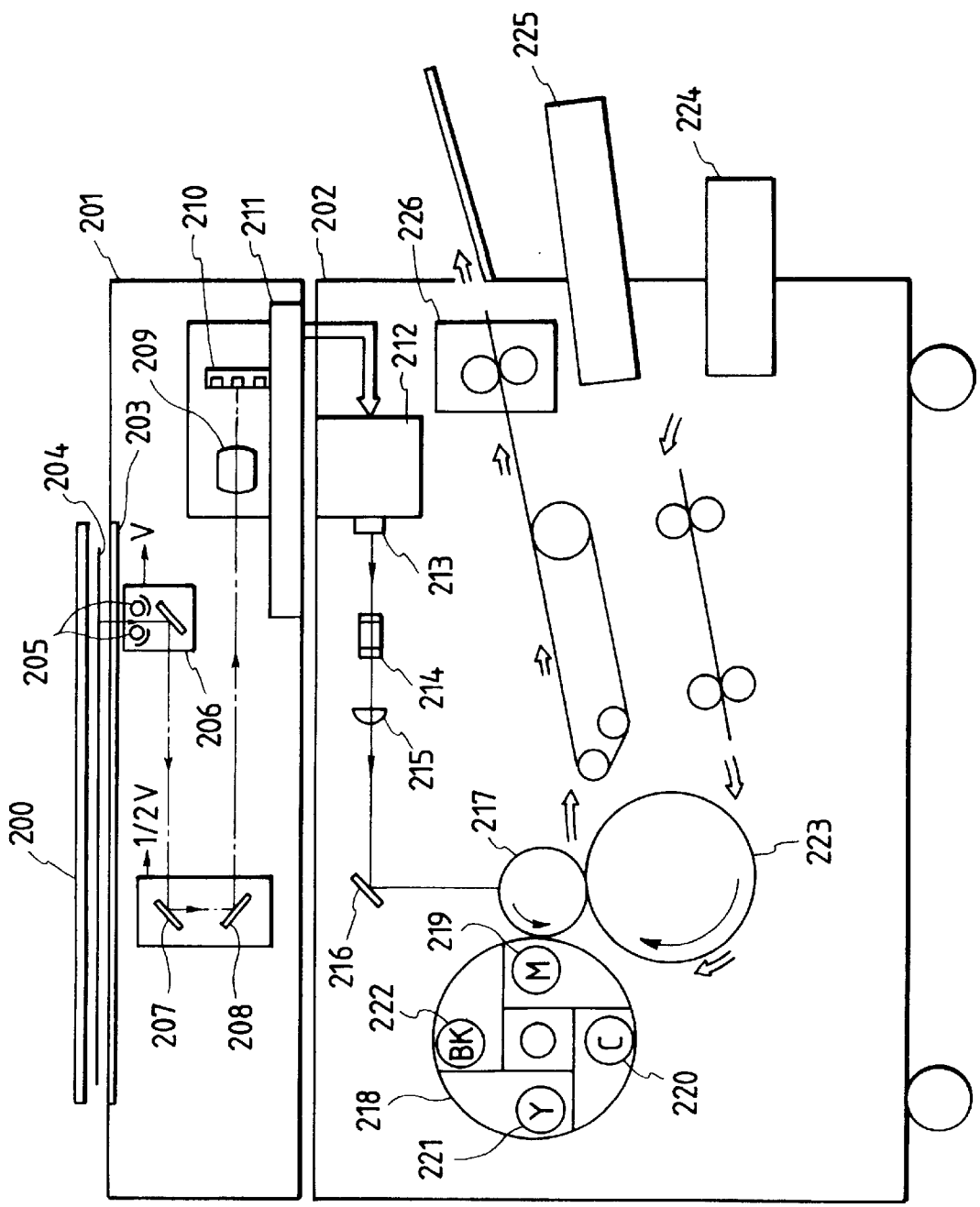
FIGS. 2A and 2B are cross-sectional views of the color copying apparatus.

FIG. 2A is a cross-sectional view of a digital color copying apparatus embodying the present invention.

An image scanner unit 201 reads a color original by color separation and effects digital signal processing. A printer unit 202 prints, on a sheet, a full-color image corresponding to the image of the original read by the image scanner unit 201.

The image scanner unit 201 is provided with a mirror-finish pressure plate 200. The original 204, placed on an original-supporting glass plate 203 (hereinafter called platen), is illuminated with lamps 205, and the reflected light is guided by mirrors 206, 207, 208 and is focused by a lens 209 onto a 3-line sensor (hereinafter called CCD) 210, which sends full-color information in the form of red (R), green (G) and blue (B) components to a signal process unit 211. The entire area of the original is scanned by the mechanical motion of the components 205, 206 with a speed v and of the components 207, 208 with a speed v/2, in a direction perpendicular to the electrical scanning direction of the 30 line sensor. The signal process unit 211 electrically processes the read signals to obtain component signals of magenta (M), cyan (C), yellow (Y) and black (Bk), which are sent to the printer unit 202. For an original scanning operation in the image scanner unit 201, one of the color component signals M, C, Y, Bk is supplied to the printer unit 202, so that a print-out is completed by four original scanning operations in total.

The image signal M, C, Y or Bk supplied from the image scanner unit 201 is supplied a laser driver 212, which modulates a semiconductor laser 213 according to said image signal. The emitted laser beam is guided by a polygon mirror 214, an f-θ lens 215 and a mirror 216 to scan a photosensitive drum 217, thereby forming a latent image of each line on said drum 217.

A rotary developing unit 218 is composed of a magenta developing unit 219, a cyan developing unit 220, a yellow developing unit 221 and a black developing unit 222, which are in turn brought into contact with the photosensitive drum 217 to develop the electrostatic latent image, formed on said drum 217, with toner of respective colors.

A sheet supplied from a cassette 224 or 225 is wound on a transfer drum 223, and the images of four colors, developed in succession on the photosensitive drum 217 are transferred onto said sheet in superposed manner.

After having received the images of four colors M, C, Y and Bk, the sheet is guided through a fixing unit 226 and is discharged.

Figure 2B:
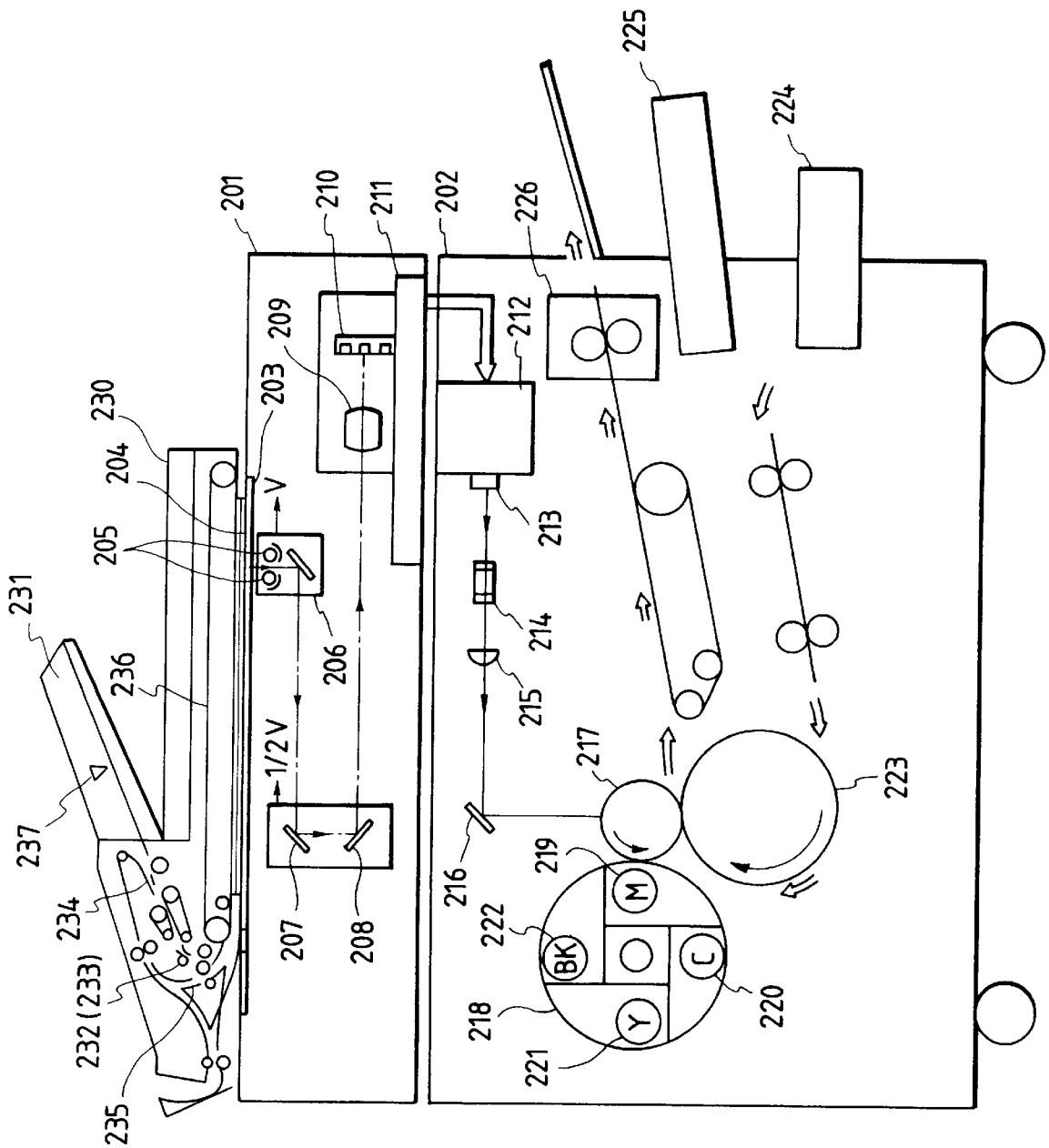

FIG. 2B shows a structure in which the pressure plate 200 is replaced by a recycling document feeder (RDF) 230, provided with a stacker tray 231 capable of stacking plural originals. Original size sensors 232, 233 are provided with a predetermined distance, in a direction perpendicular to the feeding direction of the originals. The size of the original in the transversal direction can be detected by checking whether the original is sensed by both sensors 232 and 233, or by the sensor 233 only, which is assumed to be positioned at the far side from the plane of drawing. More precise size detection is possible by increasing the number of such sensors. Also the size in the longitudinal direction can be identified from the duration of sensing of the original by the sensor 233 (or 232).

The recycling document feeder 230 is capable of stacking, again on the tray 231, the originals supplied to the exposure position through a sheet path 234 and by a belt 236, by reversing said belt 236 and utilizing another sheet path 235. A sensor 237 is provided for detecting a cycle of feeding of the originals.

Figure 1:
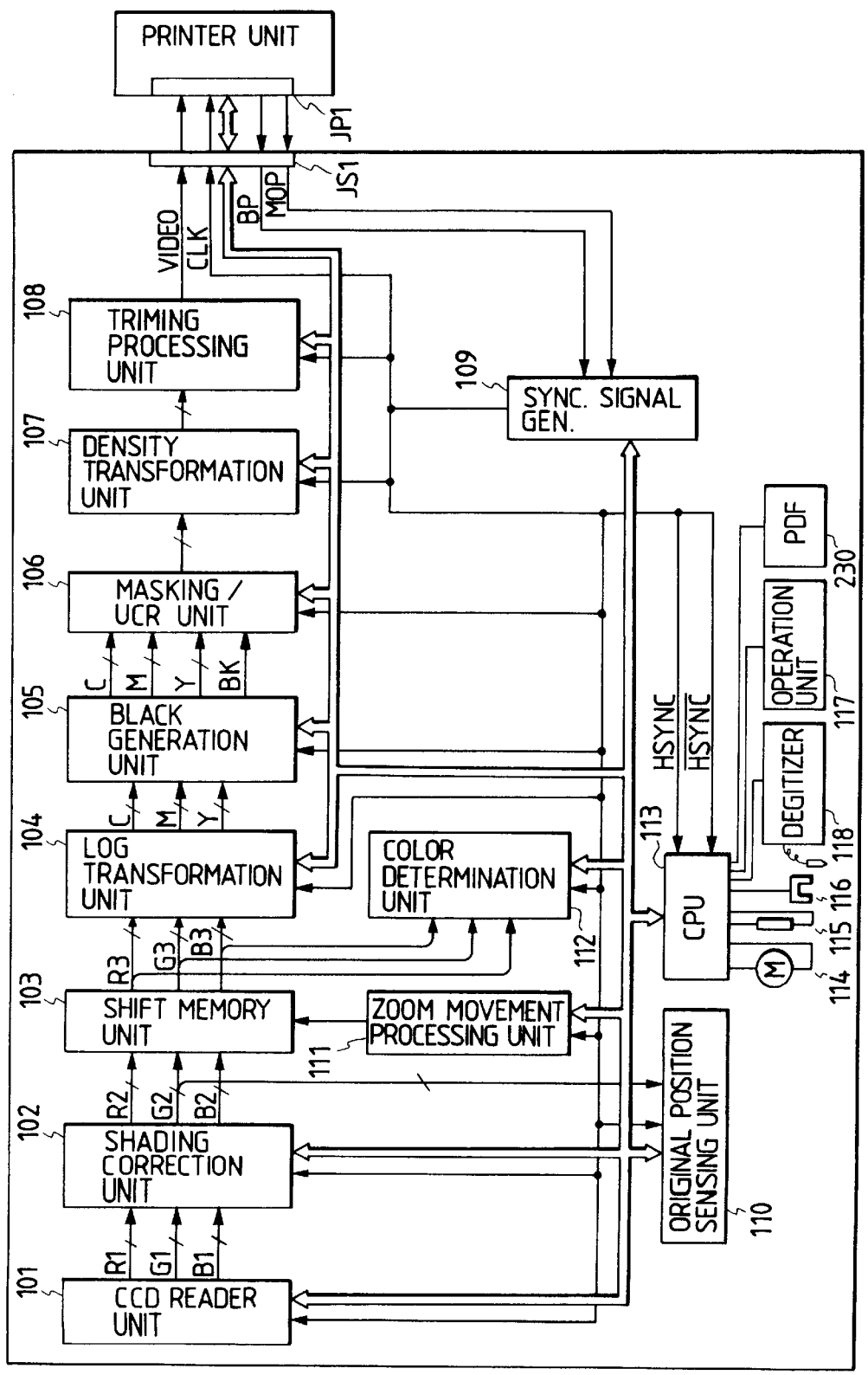
FIG. 1 is a block diagram of a color copying apparatus embodying the present invention.

FIG. 1 is a block diagram of the color copying apparatus embodying the present invention.

A CCD reader unit 101 is provided with a color sensor for providing independent color analog signals of red (R), green (G) and blue (B), amplifiers for independently amplifying said color signals, and A/D converters for converting said analog color signals into 8-bit digital signals. The signals are subjected to shading correction for respective colors in a shading correction unit 102, then to correction of aberration between colors and between pixels in a shift memory unit 103, and are supplied to a logarithmic transformation unit 104 for logarithmic correction for optical density conversion and to a color determination unit 112 to be explained later.

Density signals Y (yellow), M (magenta) and C (cyan) obtained from the logarithmic transformation unit 104 are supplied to a black generation unit 105 for generating a black signal Bk, for example by min(Y, M, C). The signals Y, M, C, Bk from the black generation unit 105 are then subjected to corrections for the filter characteristics of the color sensor and the toner density characteristics in a masking/undercolor removal (UCR) unit 106, and a signal, corresponding to the color to be developed, is selected from said four signals.

The selected color signal is subjected to density transformation in a density transformation unit 107 according to the developing characteristics of the printer unit and to the instruction of the operator, then edited into a desired section in a trimming process unit 108, and is supplied to the printer unit for image formation.

A synchronization signal generator 109 generates, based on a horizontal synchronization (beam detection) signal BD and a vertical synchronization (image top) signal ITOP supplied from the printer unit in synchronization with the printing operation of each line, a horizontal synchronization signal HSYNC and a pixel synchronization signal CLK which are supplied to various processing units and CPU in the image scanner.

An original position sensing unit 110 detects the position and size of the original, based on the binarized green (G) signal after shading correction. A zoom/movement process unit 111 varies the image magnification and moves the image by controlling the period and timing of data writing into and reading from the shift memory.

A CPU 113 includes a microprocessor and other known ancillary circuits such as I/O circuit, timer circuit, interruption control circuit, serial communication circuit, ROM, RAM, etc. and controls the above-mentioned process units. The CPU 113 also controls a stepping motor 114 for driving the optical system, original illuminating lamps 115, a sensor 116 for detecting the position of the optical system, an operation unit 117, a digitizer 118 and a recycling document feeder 230.

In the following there will be explained the detecting operation in the original position sensing unit 110.

The pressure plate 200 is mirror finished as explained before, so that the illuminating light falling thereon is normally reflected and is not condensed to the image reading sensor, thereby giving a black luminance level.

On the other hand, the usual originals have white background, giving a white luminance level in the image signal.

Figure 5:
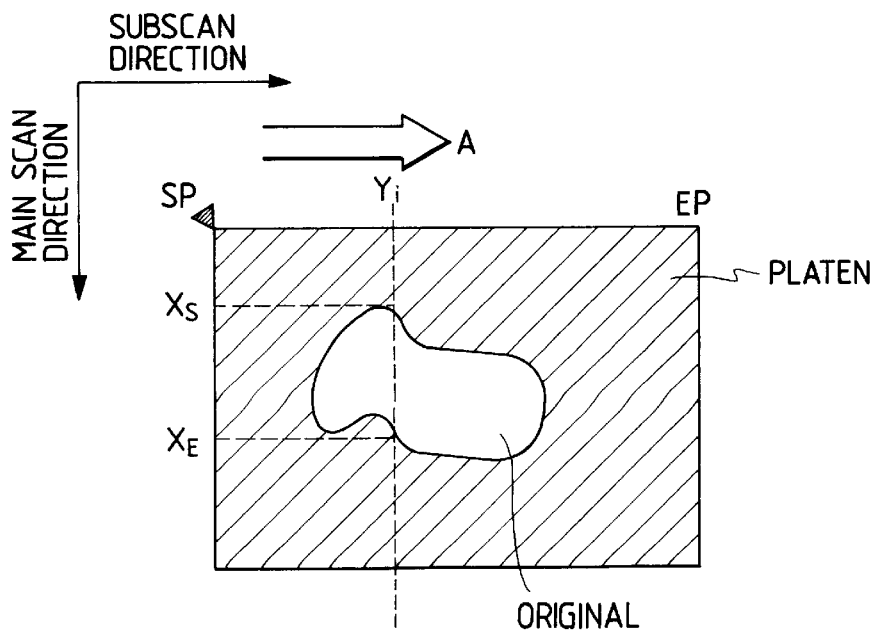
FIG. 5 is a schematic view showing the principle of a first embodiment.

Consequently, the position of an original placed on the platen can be detected by sensing, as shown in FIG. 5, the position of white signals within black signals indicated by a hatched area.

In the present embodiment, in the course of scanning motion of the optical system in a direction A from a reference point SP to the rear end of the platen, the main scanning positions XS and XE of the original at an arbitrary sub scan position Yi are detected.

Figure 4:
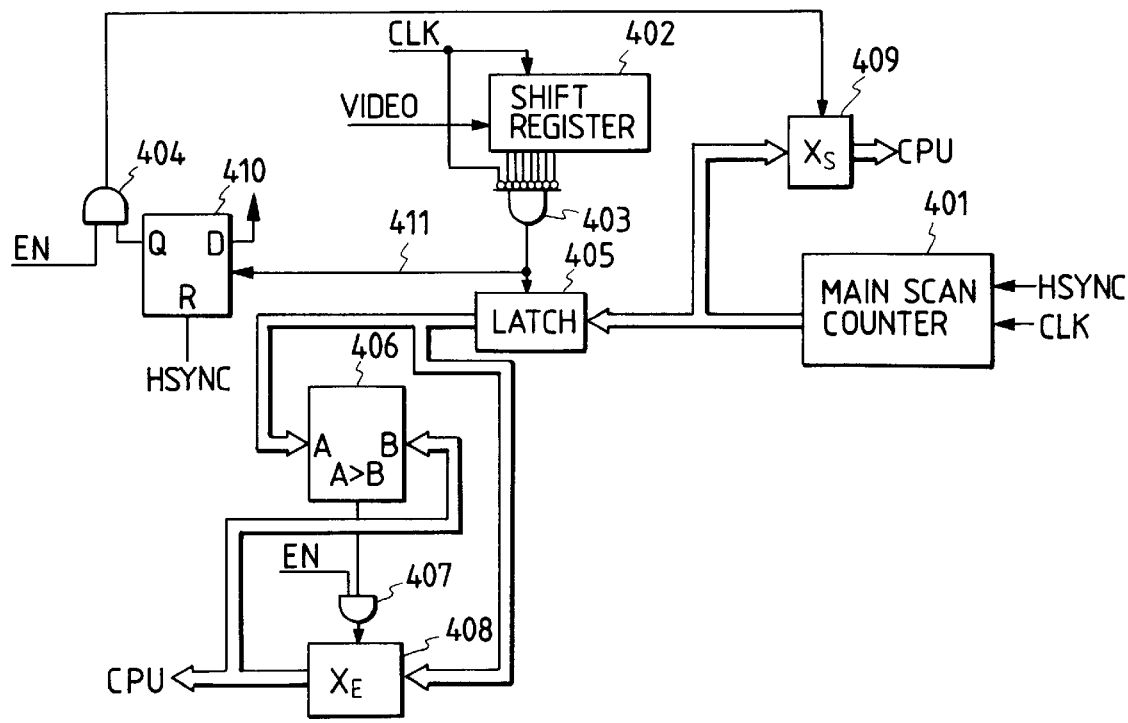
FIG. 4 is a block diagram of an original position sensing unit.

FIG. 4 shows a circuit for detecting the coordinates of said positions.

A main scan counter 401, composed of an up-counter, indicates the scan position in a main scanning line. This counter is reset by the horizontal synchronization signal HSYNC, and effects an upcount for every image data clock signal CLK.

Image data VIDEO, obtained by binarizing the green (G) signal after shading correction, are entered, in the unit of 8 bits, into a shift register 420. Upon entry of 8 bits, a gate circuit 403 discriminates whether all the 8 bits are white signals, and, if so, releases a signal "1" on a signal line 411.

A flip-flop 410 is reset by the HSYNC signal, then set in response to the first appearance of 8-bit white signal in each main scanning line, and remains in the set state until the next HSYNC signal.

If the CPU releases an EN signal "1" at the setting of said flip-flop 410, a gate 404 releases a signal "1", whereby a latch 409 is loaded with the current count of the main scan counter 401, as the coordinate XS.

Also in response to every release of the signal "1" from the gate 403, the count of the main scan counter 401 is loaded in a latch 405.

The count of the main scan counter 401, when loaded in the latch 405 in response to the first appearance of the 8-bit white signal, is compared with the data of a latch 408 in a comparator 406, and, if the former is larger and if the EN signal from the CPU 113 is "1", the data of the latch 405 is loaded in the latch 408. This procedure is conducted before the entry of next 8-bit VIDEO signal into the shift register 402.

This comparison of the latches 405 and 408 is continued during a main scanning line, whereby the latch 408 retains a main scan coordinate corresponding to the last appearance of 8-bit white signal in the main scanning direction, namely the main scan coordinate XE.

FIG. 6 is a timing chart showing an example of coordinate detection.

The horizontal synchronization signal HSYNC (1) represents an effective section of the image, or the main scanning section on the platen. At the downshift of said HSYNC signal (1), there is supplied an interruption signal INT1 (2) to the CPU 113.

The CPU 113 starts the motion of the optical system in the sub scanning direction, and, upon detecting the arrival of the optical system at the reference point SP (5), turns on the EN signal (3). The above-explained sensing circuit shown in FIG. 4 executes the sensing operation in the unit of a HSYNC signal section while the EN signal is turned on.

After turning on said EN signal, the CPU 113 turns off said EN signal upon counting the interruption signals INT1 twice. This is because the turning-on of the EN signal is not necessarily synchronized with the HSYNC signal, so that a proper sensing operation over the entire main scanning section cannot be assured in a sensing section P(4) corresponding to the first interruption signal INT1 after the turning-on of the EN signal. On the other hand, a sensing section Q(4) up to the second interruption signal INT1 after the turning-on of the EN signal covers the entire main scanning section and therefore provides reliable coordinate values XS, XE. After the fetching of the detected coordinates, the EN signal is turned on again and the next INT1 signal is awaited. This procedure is repeated thereafter.

The above-explained structure and control allows to detect the main scanning section XS, XE of the original at an arbitrary sub-scanning position Yi.

Figures 3A, 3B:
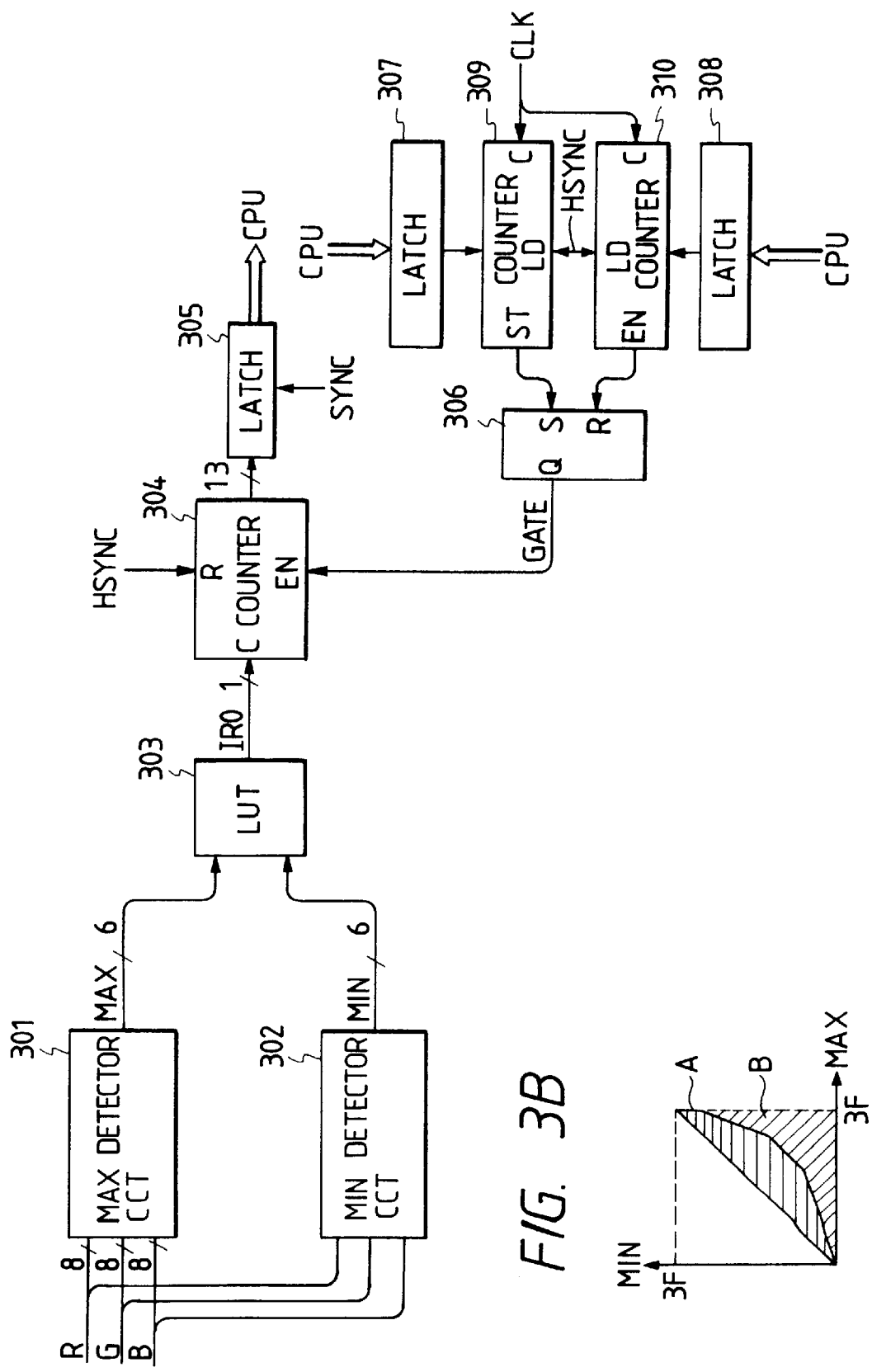
FIG. 3A is a block diagram of a color determination unit.
FIG. 3B is a chart of a color determination table.

FIG. 3A shows the structure of the color determination unit 112 shown in FIG. 1.

The signal components R, G, B of a pixel read from the shift memory 103 are supplied to a maximum detector circuit 301 and a minimum detector circuit 302, which respectively release signals MAX=max(R, G, B) and MIN=min(R, G, B). In the present embodiment, in response to the signals R, G, B of 8 bits each, there is obtained signals MAX, MIN of 6 bits each.

Said signals MAX and MIN are supplied, as address signals, to a look-up table LUT 303, thereby obtaining a color determination signal IRO of 1 bit. FIG. 3B shows the content of said look-up table 303, in which, in a two-dimensional plane defined by the input signals MAX and MIN, an area A is identified as non-colored and provides an output signal "0" while an area B is identified as colored and provides an output signal "1". The signal IRO thus obtained is supplied, as a clock signal, to a counter 304.

Said counter 304 is reset by the horizontal synchronization signal HSYNC, and counts the number of the determination signals IRO, representing the number of pixels identified as colored, in a section enabled by the GATE signal from a flip-flop 306, in a main scanning line. The obtained count is read by the CPU 113 through a latch 305.

The flip-flop 306 is set by a count-up signal from a start bit counter ST 309, and is reset by a count-up signal from an end bit counter EN 310, thereby generating a count enable signal GATE for the counter 304. Said ST and EN counters 309, 310 effect down-counting of values stored by the CPU in latches 307, 308.

As explained in the foregoing, there can be counted the number of pixels, identified as colored, in an arbitrary section defined on each main scanning line.

Figure 7B:
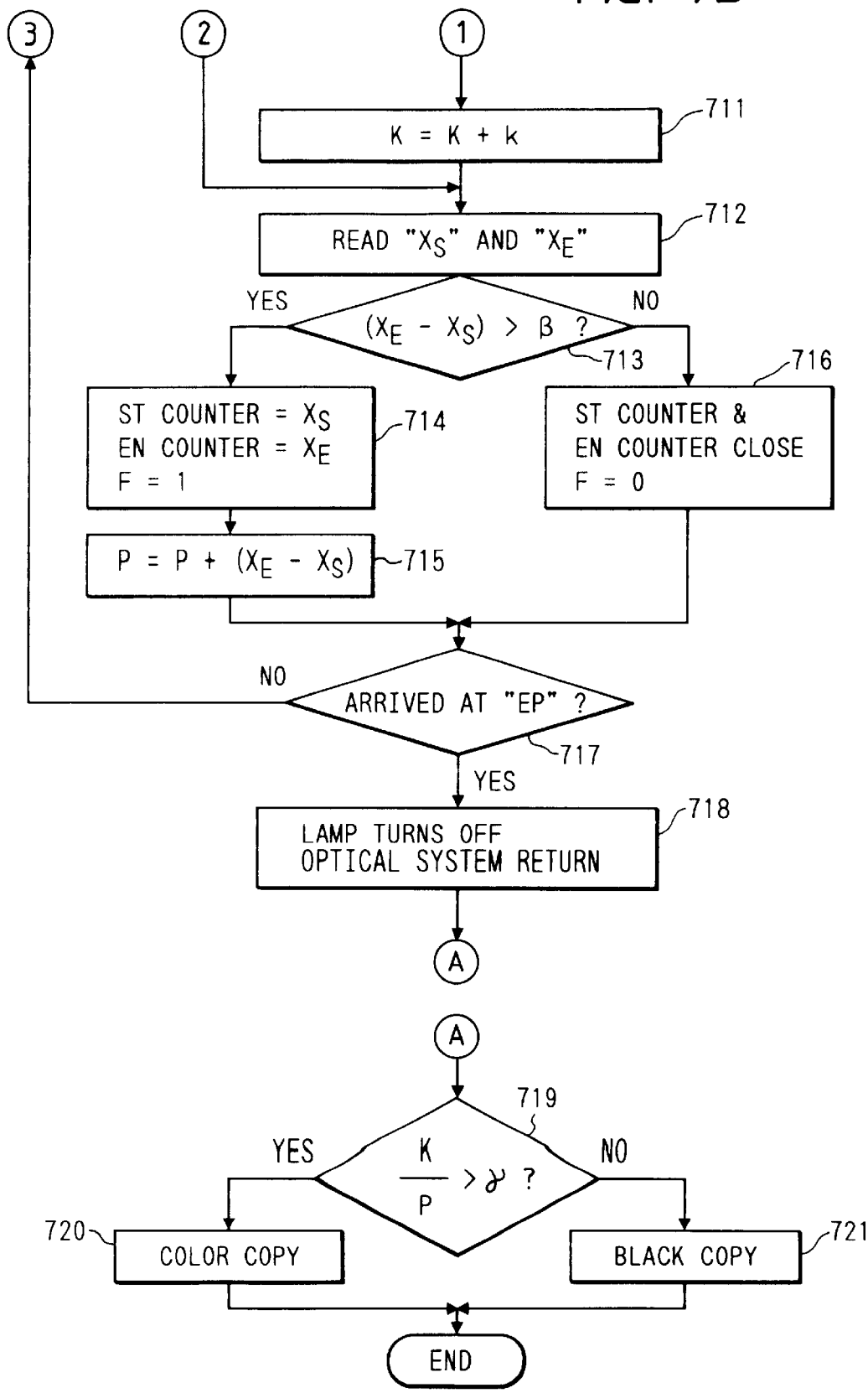
FIG. 7 is a flow chart of the control sequence of the first embodiment.

FIG. 7 shows the control sequence of the first embodiment.

At first, a counter K formed in the RAM for cumulative counting of the colored pixels, and a counter P formed in the RAM for cumulative counting of the sampled pixels are both initialized to "0" (step 701). Then two counters ST, EN, shown in FIG. 3 for generating the determination section signal GATE, are loaded with values larger than a main scanning cycle, in order to prohibit generation of the GATE signal, and, a state-indicating flag F in the RAM is set at "0" (step 702). The illuminating lamp and the optical system are activated (step 703), and, upon arrival of the optical system at the reference point SP of the platen (step 704), the aforementioned EN signal is turned on (step 705). Subsequently, upon second reception of the interruption signal INT1 at the downshift of the HSYNC signal (step 706), the EN signal is turned off (step 707).

Figures 1, 14:
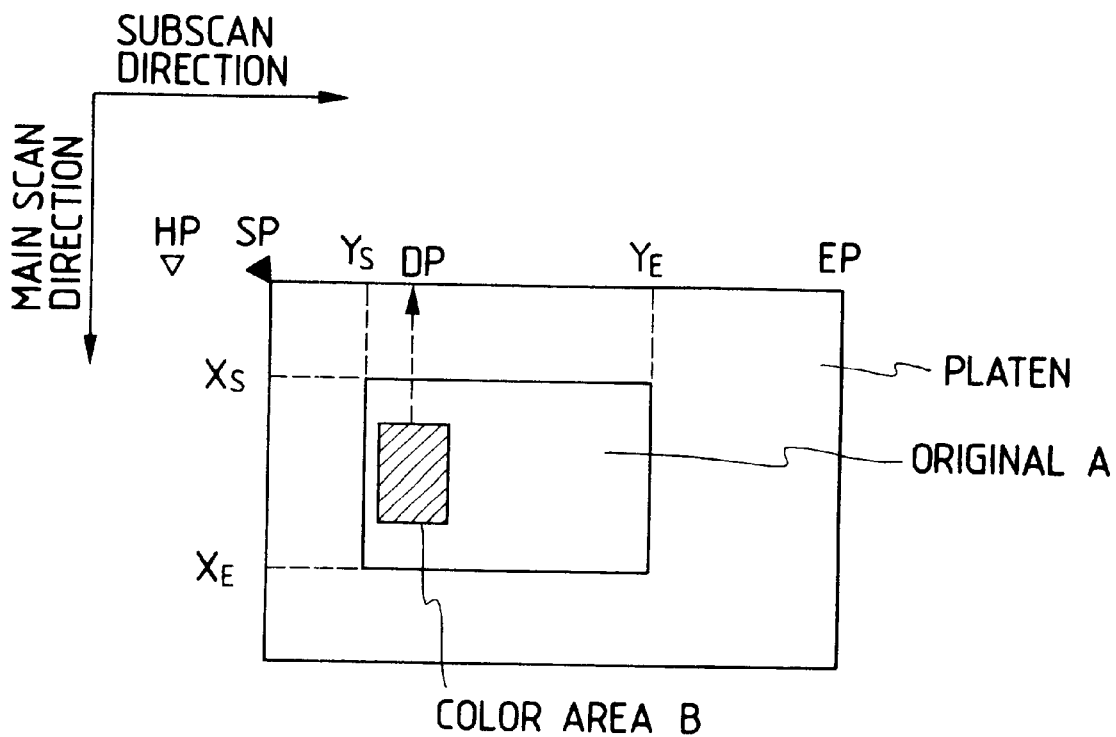
Figures 2, 14:
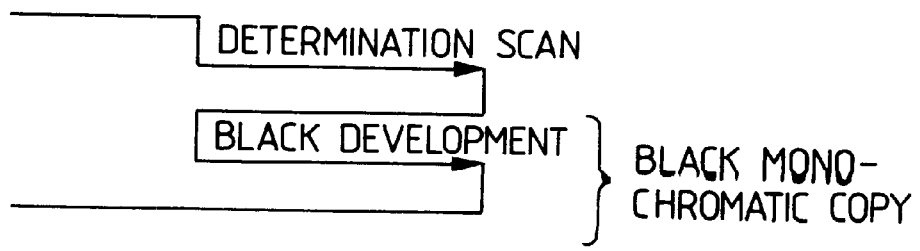
Figures 3, 14:
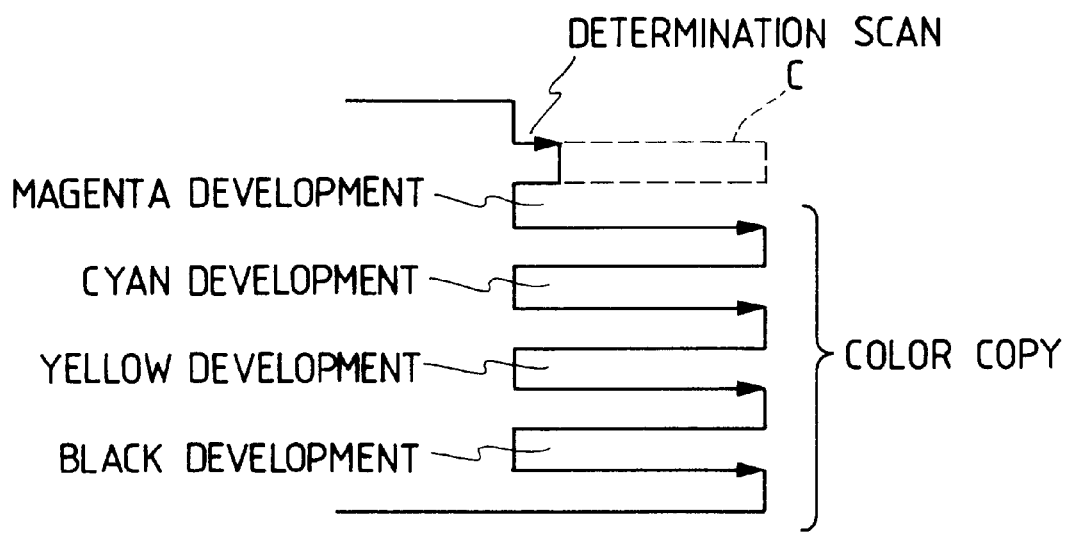
Figures 4, 14:
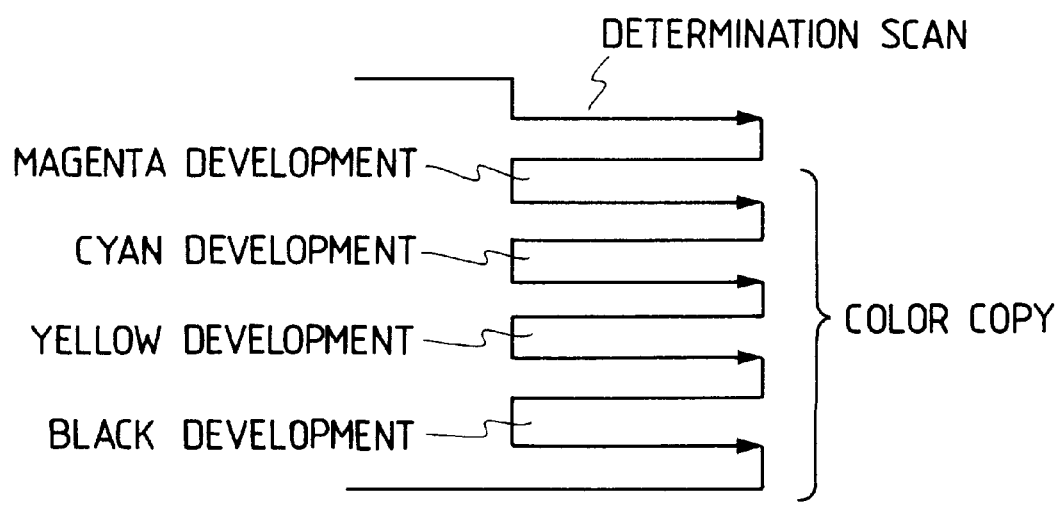

If the flag F. indicating the state of the GATE signal in the preceding interruption, is "1" (step 708), namely if an effective sampling section is selected, the count of said counter 304, shown in FIG. 3, is read through a latch 305 and set, as the number of colored pixels, in a buffer K in the RAM (step 709). If the count K is larger than a predetermined value $\alpha$ (step 710), it is added to the above-mentioned cumulative counter K (step 711). This comparison with a is simplest method for noise elimination. If the flag is "0" in the step 708, the count is not read as the counting operation has not been conducted.

Then the original positions XS and XE are read from two latches 408, 409 in the original position detecting circuit shown in FIG. 4 (step 712), and, if XE–XS, or the distance between the positions XS and XE is larger than a predetermined value $\beta$ (step 713), the detection of an original is identified. Thus the counters ST, EN are respectively loaded with XS and XE for defining the next section for counting the colored pixels, and the above-mentioned flag F is set at "1" (step 714). Also XE−XS, indicating the number of all the pixels in the section subjected to the counting of colored pixels, is added to the cumulative counter P (step 715). On the other hand, if XE−XS is smaller than 6, indicating the non-detection of the original, the counters ST, EN are loaded with values larger than a main scanning cycle in order to prohibit the counting of the colored pixels, and the flag F is set at "0" (step 716).

The above-explained steps 705–716 are repeated until the optical system reaches the rear end point EP of the platen (step 717), then the lamp is turned off and the optical system is returned to the start position (step 718), whereby the sampling operation is terminated.

Since the image signal G2 from the shading correction unit 102, for detecting the position of the original and the image signals R3, G3, B3 from the shift memory 103 for color determination are controlled in such a manner that the signal G2 preceeds by 2 lines at said shift memory 103, the position of the original can be matched with the color determination section, by reading the count of the colored pixels based on said signals R3, G3, B3 after 2 lines from the setting of the section based on the signal G2.

Upon completion of the sampling, a value K/P, namely a ratio of the number of colored pixels to the number of total sampled pixels is compared with a predetermined value γ (step 719), and, if the ratio K/P is larger, a color original is identified and a color copying operation is conducted (step 720), or, if the ratio K/P is smaller, a black-and-white original is identified and a black monochromatic copying operation is conducted (step 721).

As explained in the foregoing, the present embodiment enables exact black-and-white/color determination for the originals of various shapes, and is therefore effective for reducing the time and cost of copying.

Also the present embodiment does not require the memory of a large capacity, and only requires a single sampling scan, because the color determination section is made to dynamically correspond to the original section recognized in succession in the course of scanning of the original.

The above-mentioned comparison of K/P with γ is just an example, and it is also possible to simply compare K with a predetermined value.

The foregoing first embodiment is to deal with the original of an undetermined shape. In contrast, a following second embodiment is to deal with rectangular area entered by the operator.

Figures 1, 8:
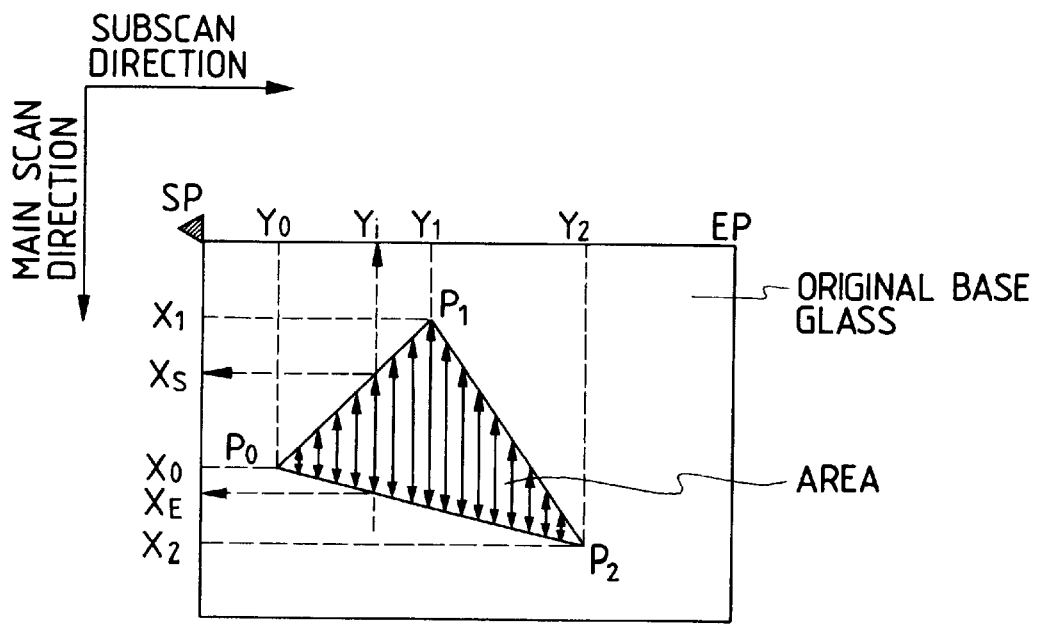

FIG. 8-1 shows the concept of the second embodiment. In case of copying the interior of a triangle formed by points P0, P1, P2 entered in succession by the operator with a digitizer, the black-and-white/color determination is conducted only on the image inside said triangular area. In this case, as shown in FIG. 8-1, the determination section is defined as indicated by an arrow for each main scanning line. For example, the determination section is defined between XS and XE at a sub scanning position Yi.

This second embodiment is different from the first embodiment in that the sampling area is already known.

Figures 2, 8:
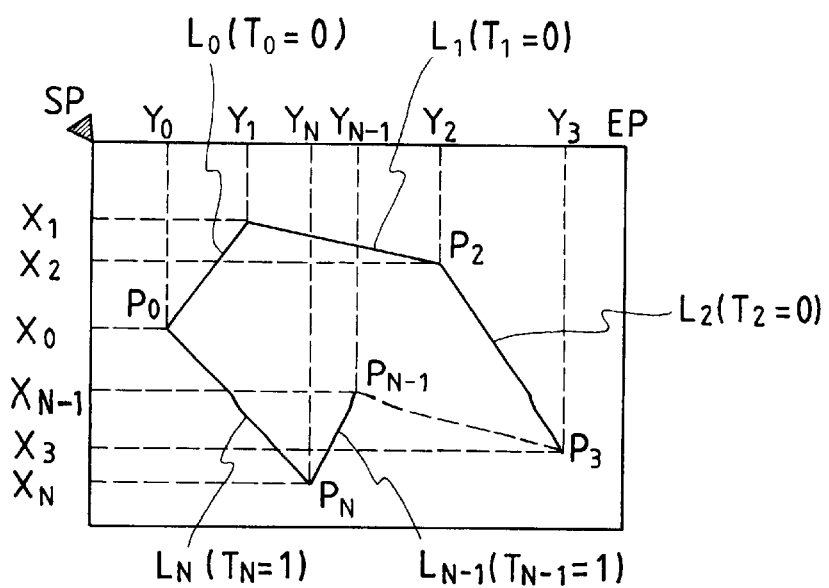
Figure 9:
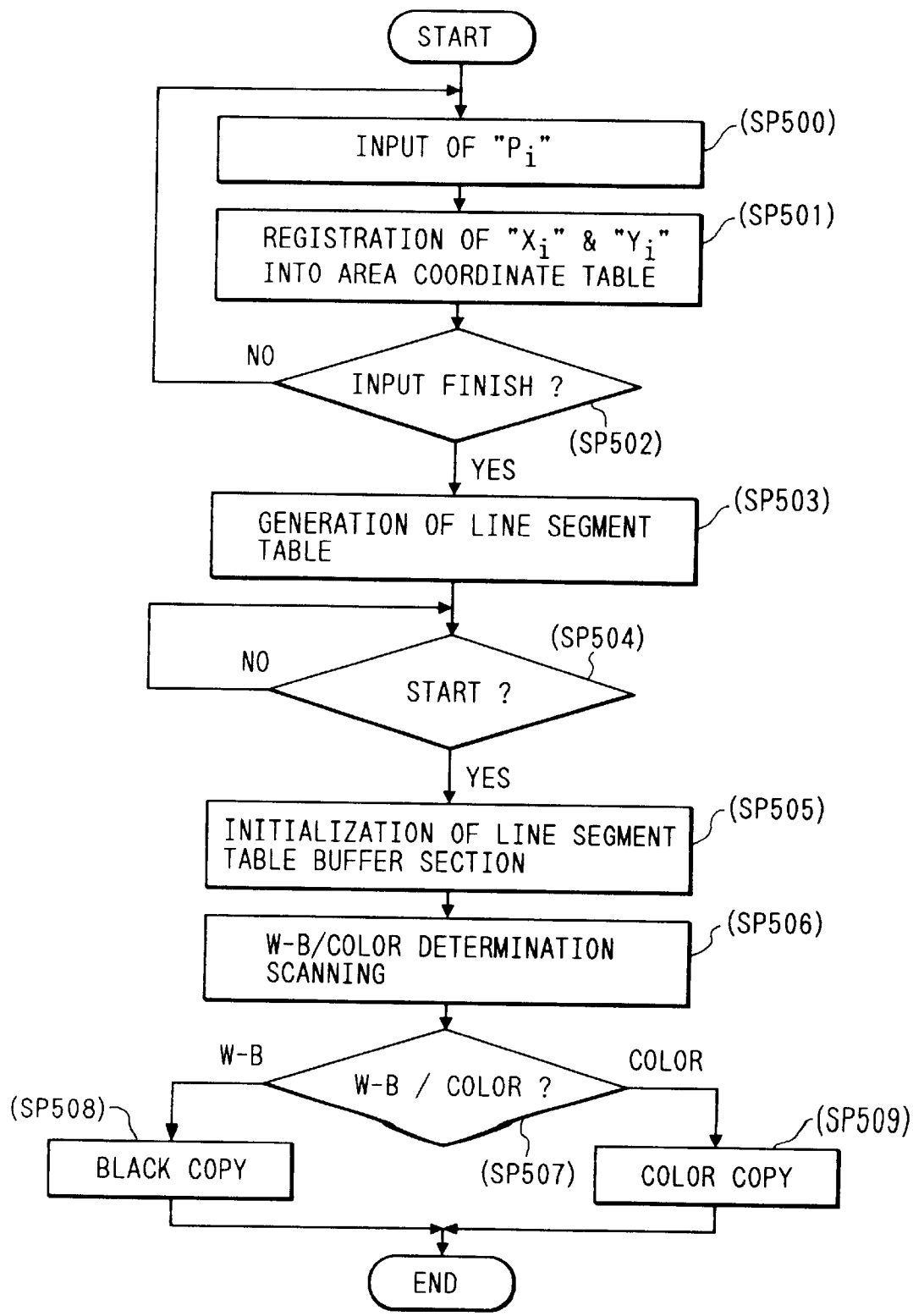
FIGS. 9 and 12 are flow charts of the control sequence of the second embodiment.
Figure 10:

The control sequence of the second embodiment is shown in FIG. 9. As the operator enters the points $P_0, P_1, \ldots P_N$ in succession with a digitizer 118 as shown in FIG. 8-2, the corresponding coordinates $(x_0, y_0), (x_1, y_1), \ldots, (x_N, y_N)$ are registered in a coordinate table, formed in an area of the RAM, as shown in FIG. 10 (steps SP500, SP501).

Upon completion of the entry of all the necessary points (step SP502), there are prepared, in an area of the RAM, line segment tables as shown in FIG. 11, corresponding to the line segments surrounding the area (step SP503).

For example, for an area shown in FIG. 8-2, there are defined N+1 line segments $L_0, L_1, L_2, \ldots, L_N$ wherein $L_0$ is a line segment connecting the points $P_0$ and $P_1$, $L_1$ is a line segment connecting the points $P_1$ and $P_2$ and so forth, and a line segment table as shown in FIG. 11 is prepared for each line segment. However the line segment table is not prepared for a line segment parallel to the main scanning direction, namely a line segment for which $yi=yi_{i+1}$.

The content of said line segment table will be explained more detailedly in the following.

A line segment $L_i$ connects the points $P_i$ and $P_{i+1}$. The sub-scan start coordinate $Y_{Si}$ of this line segment is $\min(Y_i, Y_{i+1})$, and the sub-scan end coordinate $Y_{Ei}$ is $\max(Y_i, Y_{i+1})$.

Also the main-scan start coordinate $X_{Si}$ is either $X_i$ or $X_{i+1}$ respectively when $Y_{Si}$ is $Y_i$ or $Y_{i+1}$. For the purpose of convenience $X_{Ei}$ stands for the other of $X_i$ and $X_{i+1}$.

The integral part Ki of the slope of the line segment is given by $(X_{Ei}-X_{Si})/(Y_{Ei}-Y_{Si})$, and the fractional part thereof is defined by DXi satisfying a relation $X_{Ei}-X_{Si}=Ki+(Y_{Ei}-Y_{Si})+DXi$ and DYi defined by $D_{Ei}-Y_{Si}$. EXi, $X_{B0i}$ and $X_{B1i}$ are temporary buffers formed in the RAM and used in the actual copying operation.

A process content parameter Ti indicates whether the line segment Li is positioned, on the main scanning axis of the area shown in FIG. 8-2, whether at the start side (Ti=0) or at the end side (Ti=1).

After the preparation of the line segment tables in the step SP503, if the start of a copying operation is instructed by the operation unit 109 (step SP504), three buffers shown in FIG. 11, namely an arithmetic operation buffer EXi, and process coordinate buffers $X_{B0i}, X_{B1i}$ are initialized (step SP505). Then a black-and-white/color determination scan is conducted as will be explained later (step SP506), and, based on the result of said scan (step SP507), a black copying operation (step SP508) or a color copying operation (step SP509) is conducted.

Figure 12B:
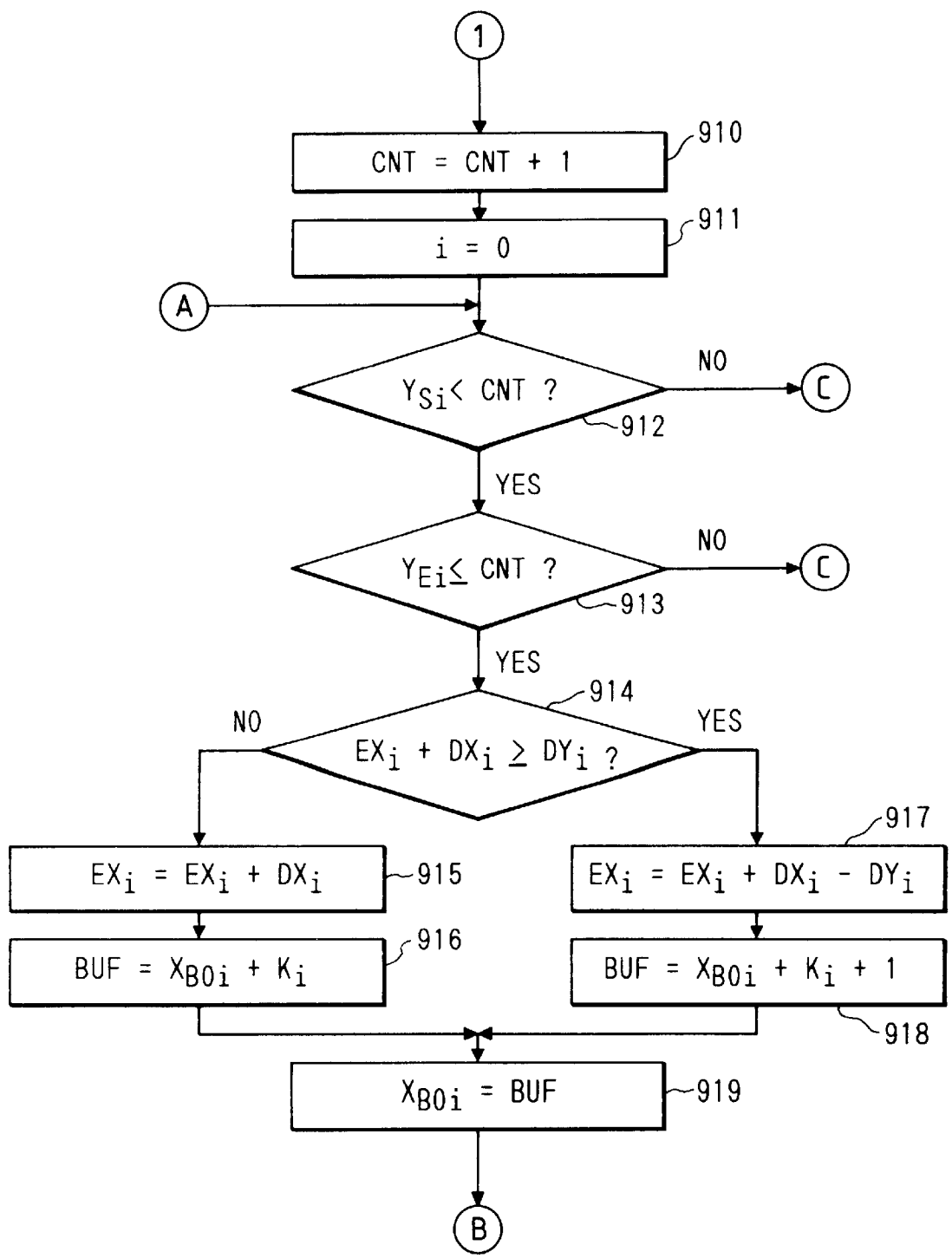
Figure 12C:
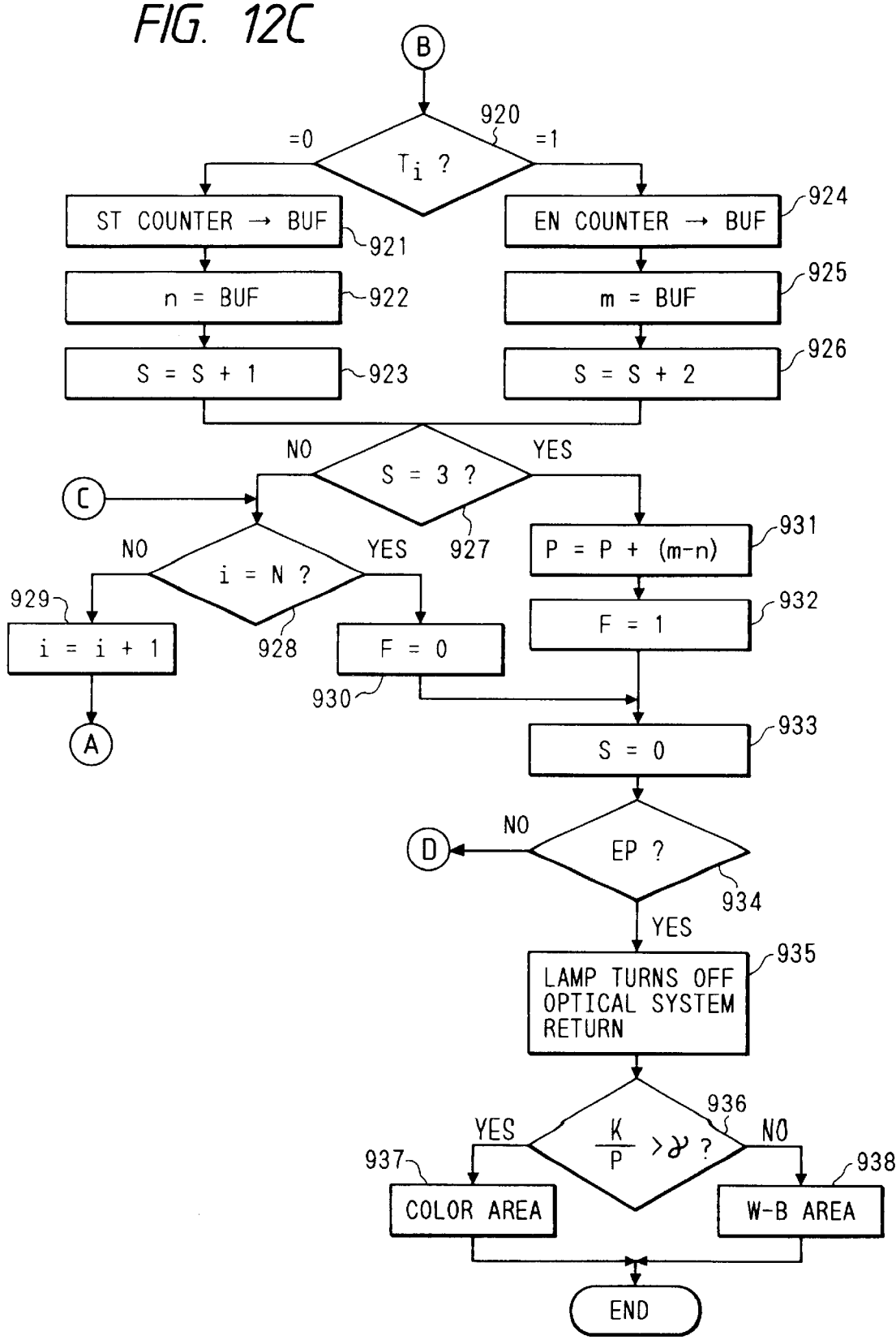

The control sequence of said black-and-white/color determination scan in the step SP506 is shown in FIG. 12.

At first a counter CNT, formed in the RAM for counting the sub scan position, is initialized to "0" (step 901), and RAM areas K, P for cumulative counting of the colored pixels and the total sampled pixels are also initialized to "0" (step 902). The aforementioned counters ST, EN, for defining the determination section, are loaded with values larger than a main scanning cycle, in order to prohibit the generation of the GATE signal, and the flag F, indicating the state thereof, is set at "0" (step 903). Then the illuminating lamp and the optical system are activated (step 904), and, upon arrival of the optical system at the reference point SP (step 905), the interruption by the aforementioned signal INT1 is awaited (step 906). When said interruption takes place while the flag F is "1" (step 907), the number of color pixels is read from the counter 304 shown in FIG. 3, then set in a buffer K in the RAM (step 908) and added to the cumulative counter K (step 909).

Then the count of the sub scan counter CNT is increased by one (step 910), and a RAM counter i, for counting the line segments, is reset to "0" (step 911) in order to effect a check procedure starting from a step 912, on the aforementioned line segments $L_0$–$L_N$. Then there is discriminated, by a comparison $Y_{Si}$<CNT<$Y_{Ei}$, whether the line segment Li includes the current sub-scan position CNT (steps 921, 913), and, if not, the sequence jumps to (c). On the other hand, if the current sub-scan position corresponds to the line segment Li, there is executed a process of steps 914–919 for generating a line segment of arbitrary slope in discrete manner.

As the slope of the line segment is defined by the integral part Ki and the fractional part DXi/DYi as explained before, the main scan coordinate increases at least by Ki for a step increase of the sub scan coordinate (steps 916, 198).

As regards the fractional part, the numerator DXi is added to the temporary buffer EXi for every step increase of the sub scan coordinate (step 915), and, when the sum exceeds DYi (step 914), the main scan coordinate is increased by one (step 918). At the same time DYi is subtracted from the temporary buffer EXi (step 917). Said temporary buffer EXi is initialized to "0" prior to the start of the sub scanning operation.

The main scan coordinate BUF thus obtained is stored in the process coordinate buffer $X_{B0i}$, in preparation for the next interruption (step 919).

Then the value Ti is checked (step 920). If Ti=0, indicating that the line segment Li is at the start side of the area with respect to the main scanning direction, the ST-counter (319 in FIG. 3) which controls the start of the determination section is loaded with said value BUF (step 921). If Ti=1, indicating the end side of the area, the EN-counter (301 in FIG. 3A) is loaded with said value BUF (step 924).

Also for the purpose of calculation of the number of sampled pixels, said value BUF is set in a RAM area n or m, respectively in case of the start side or the end side (steps 922, 925).

Also the bit 0 or 1 of a flag S, indicating the set state of the counters ST, EN, is set at "1" respectively in case of the start side or the end side (steps 923, 926).

When the start and end are fixed, both bits 0 and 1 of said flag S assume state "1" (step 927), thus representing a value "3". Then a value (m–n) is added to the sample pixel counter P (step 931), and the flag F is set at "1" (step 932). If S is not "3" (step 927), there is discriminated whether all the line segments have been checked (step 928), and, if not, the count of the line segment counter i is increased by one (step 929), and the sequence returns to (a). If all the line segments have been checked, there is identified a situation where the current position does not correspond to any of the line segments. Thus the counters ST, EN are loaded with such values as to prohibit upcounting, and the flag F is set at "0" (step 930). After the setting of the flag F at "1" or "0", the temporary flag S is set at "0" (step 933) whereby an interruption procedure is terminated. Thereafter the steps 906–933 are repeated until the optical system reaches the end point EP (step 934).

Subsequently the optical system is returned to the start position (step 935), and, as in the first embodiment, a color image or a black-and-white image is identified respectively if the ratio K/P is larger or smaller than a predetermined value γ.

The first and second embodiments relate to means for black-and-white/color determination in an area to be copied, but the concept of the present invention is applicable to any means for detecting the characteristic amount of the original.

In a third embodiment, the image density of the original is taken as another characteristic amount.

Figure 13:
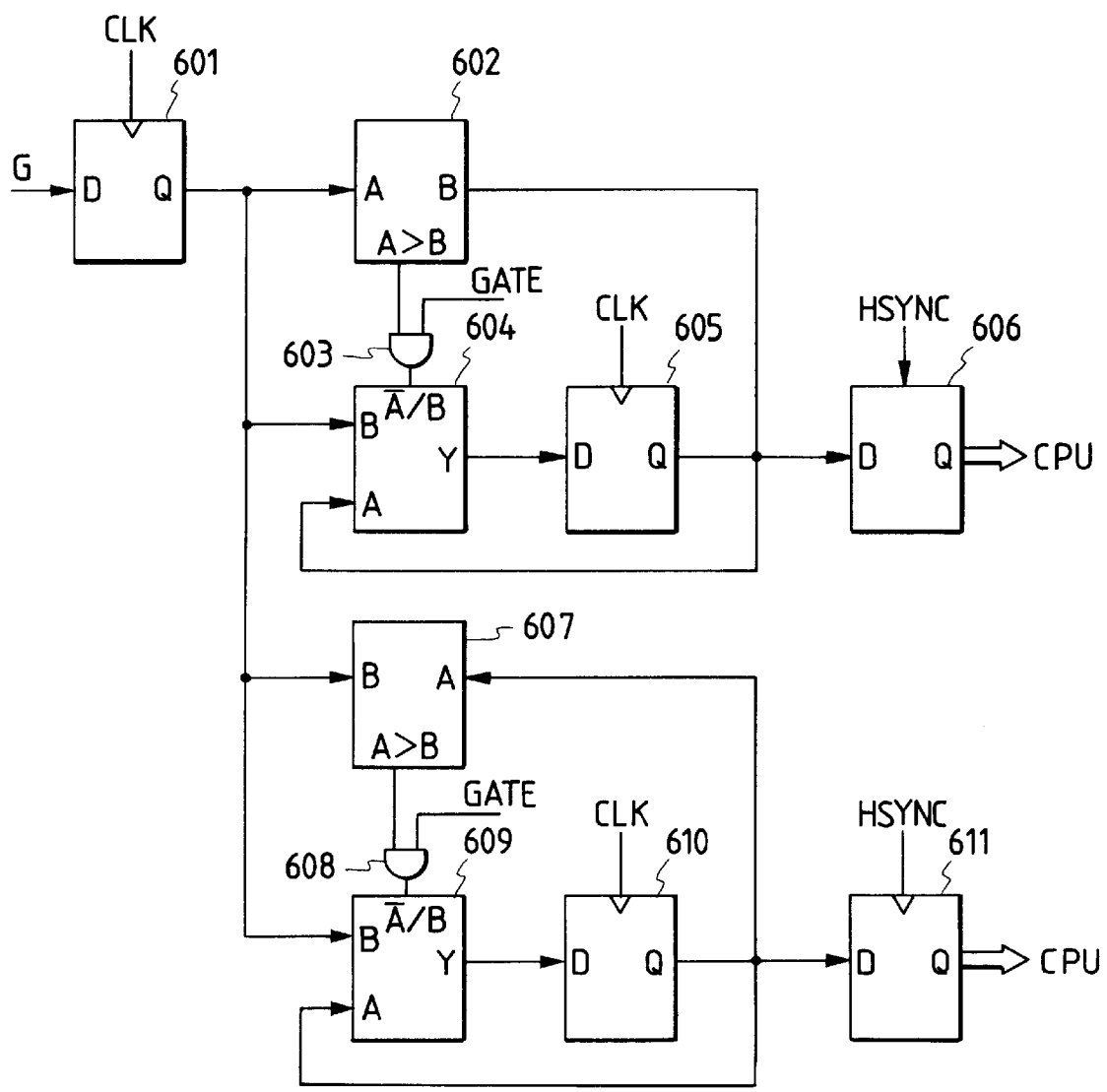
FIG. 13 is a block diagram of a third embodiment.

FIG. 13 is a block diagram of an original density detecting circuit, which will be explained in the following.

A latch 601 receives, for example, the green (G) output of the shading correction unit 102 in FIG. 1.

The output of the latch 601 is supplied to a comparator 602, compared with the output of a latch 605 for the video signal which precedes at least by a clock signal, and, if the output of the latch 601 is larger, an output signal "1" is sent to a gate 603. When the section signal GATE shown in FIG. 3 and the output of the comparator 602 are both "1", the gate 603 causes a selector 604 to send the output of the latch 601 as a new video signal to a latch 605.

The above-explained operation is continued for a main scanning line whereby the maximum density thereof is stored in a latch 606, for readout by a CPU 113.

Similarly a comparator 607, a gate 608, a selector 609 and a latch 610 detect the minimum density in a main scanning line, and the CPU 113 can read said minimum density through a latch 611.

Based on the above-explained process conducted over a predetermined sub scanning section, the CPU 113 prepares a histogram utilizing the maximum and minimum densities in a predetermined area, and determines an optimum density transformation curve which can be used in the density transformation unit 107 in FIG. 1.

The black-and-white/color determining function in the first or second embodiment may be replaced by the above-explained density detecting function, whereby the density detection in an image of an indefinite shape or in a non-rectangular area determined by the operator is rendered possible, and there is also obtained an advantage that such density detection is rendered possible with a single sample scanning.

As explained in the foregoing, the exact color/black-and-white determination is rendered possible in an original image area of an arbitrary shape, and this can be achieved without a memory of large capacity. Also the detection of coordinates of the original and the color/black-and-white determination can be achieved in a single sub-scanning operation.

In the foregoing embodiments, the determination of a black-and-white image or a color image in an original or an arbitrarily designated area of the original is conducted by a pre-scanning of the entire original or the entire designated area.

However, a color image can be identified without pre-scanning of the entire image area, if a color image is present even in a part of the original or the designated area.

In the following there will be explained such an embodiment. A fourth embodiment is schematically shown in FIG. 14.

FIG. 14-1 shows an original A, placed on the original supporting glass plate 230, and having a color image area B close to the front end. Conventionally, even when the coordinates of the original A are known, the determining pre-scan is conducted over the entire original area. In the present embodiment, however, the determining pre-scan is interrupted for example at a sub-scanning position DP where the presence of color information in the original A can be identified, and a full-color copying operation is conducted, so that the scanning time corresponding to a line segment C can be dispensed with.

On the other hand, if the color information cannot be detected in the scanning to the end $Y_E$ of the original as shown in FIG. 14-2, it is identified as a black-and-white original and a black monochromatic copying is conducted.

Figure 15:
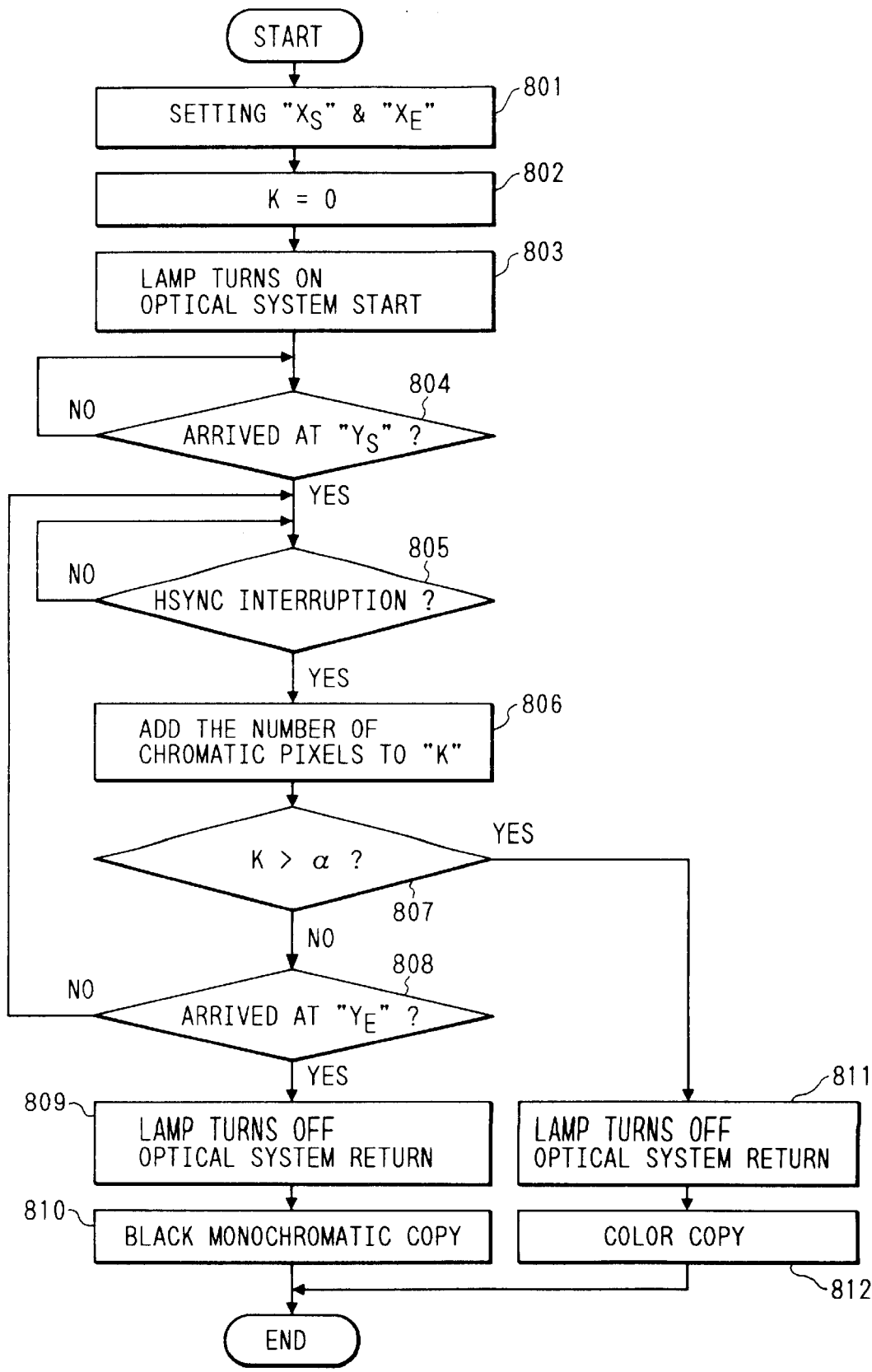
FIG. 15 is a flow chart of the control sequence of the fourth embodiment.

FIG. 15 shows the control sequence of the fourth embodiment.

At first the ST-counter 309 and the EN-counter 310 shown in FIG. 3 are loaded respectively with the main scanning coordinates XS, XE of the original (step 801), then a counter K, formed in the RAM for cumulatively counting the colored pixels detected in the structure shown in FIG. 3, is initialized to zero (step 802), and the illuminating lamp and the optical system are actived (step 803). Upon arrival of the optical system at the sub-scan start position YS of the original (step 804), and in response to an interruption procedure by the horizontal synchronization signal HSYNC (step 805), the CPU reads the count of the colored pixels in the counter 304 shown in FIG. 3 and adds said count to the cumulative counter K (step 806).

If the cumulative value K exceeds a predetermined value α (step 807), a color original is identified. Then the lamp is turned off, and the optical system is returned to the start position (step 811), and a color copying operation is conducted (step 812). On the other hand, if the cumulative value K is smaller than α at the step 807, there is discriminated whether the end YE of the original has been reached (step 808), and, if not, the sequence returns to the step 805 to repeat the above-explained procedure. If K is still smaller than α at the end YE (step 808), the lamp is turned off and the optical system is returned to the start position (step 809), and then a black monochromic copying is conducted.

As explained in the foregoing, it is rendered possible to reduce the time for pre-scanning for automatic determination of a color original.

For example, in case of scanning an A3-sized original with a forward speed of 160 mm/sec and reversing the optical system with a doubled speed, the reduction in pre-scanning time amounts to about 4 seconds at maximum.

The above-explained fourth embodiment is effective in a case in which the position of the original is known in advance. On the other hand, a fifth embodiment is applicable to a case in which the position of the original is not known, and is to reduce the pre-scanning time by detecting the position of the original as well as identifying the color information of the original in the pre-scanning operation.

Figures 1, 16:
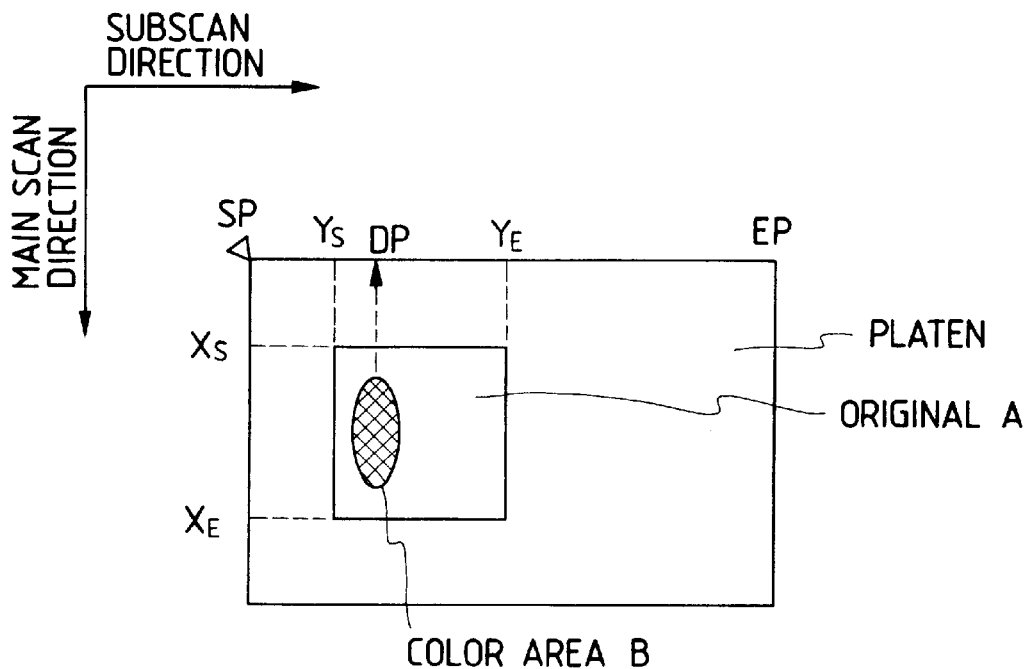
Figures 2, 16:
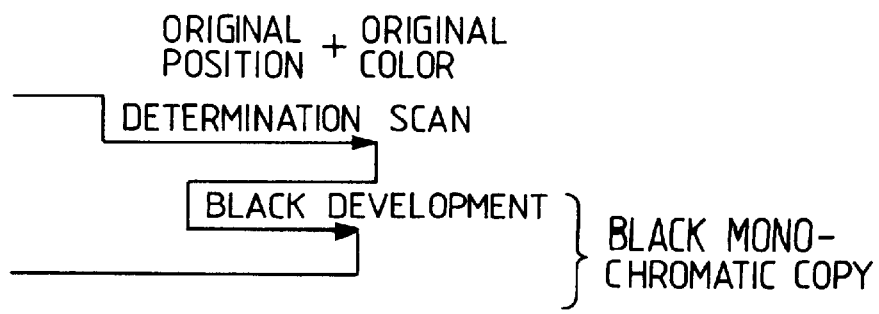
Figures 3, 16:
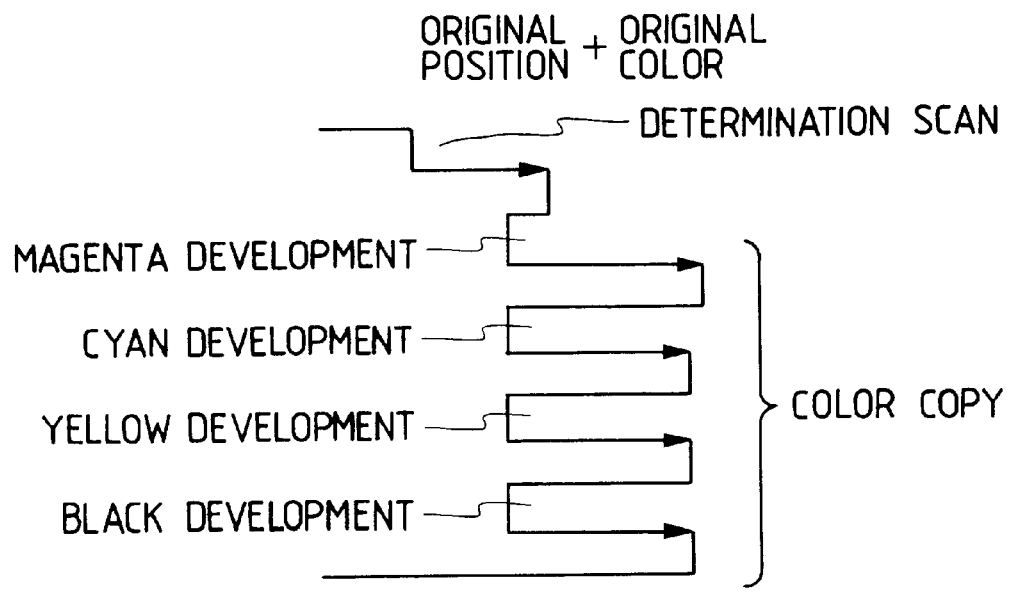
Figures 4, 16:
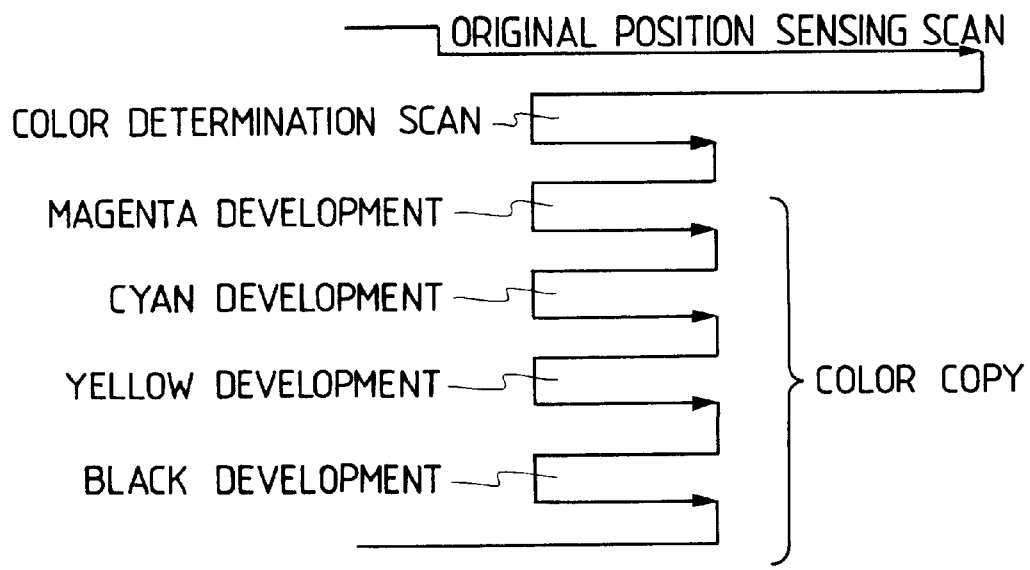

FIG. 16 shows the principle of the fifth embodiment. FIG. 16-4 shows a time-consuming conventional method in which the entire platen area is at first scanned to detect the position of the original, then the detected original area is scanned to identify whether the image is colored or black-and-white, and a color or black copying operation is thereafter conducted. In contrast, in the fifth embodiment, a determination scan is conducted as shown in FIG. 16-3 for simultaneous position detection and color determination of the original, and upon detection of presence of color information, the pre-scanning is interrupted and a color copying operation is conducted.

Also in case of a black-and-white original, the pre-scanning is interrupted if the end of the original A is detected before detection of presence of color information, and a black monochromic copying operation is conducted.

In the following there will be explained the structure required for realizing the principle shown in FIG. 16.

Firstly, the principle of original coordinate detection required in the fifth embodiment is same as that already shown in FIGS. 4 and 5. The structure shown in FIG. 4 allows to detect the main scan section $X_S$, $X_E$ of the original at an arbitrary sub-scan position Yi.

Figure 17B:
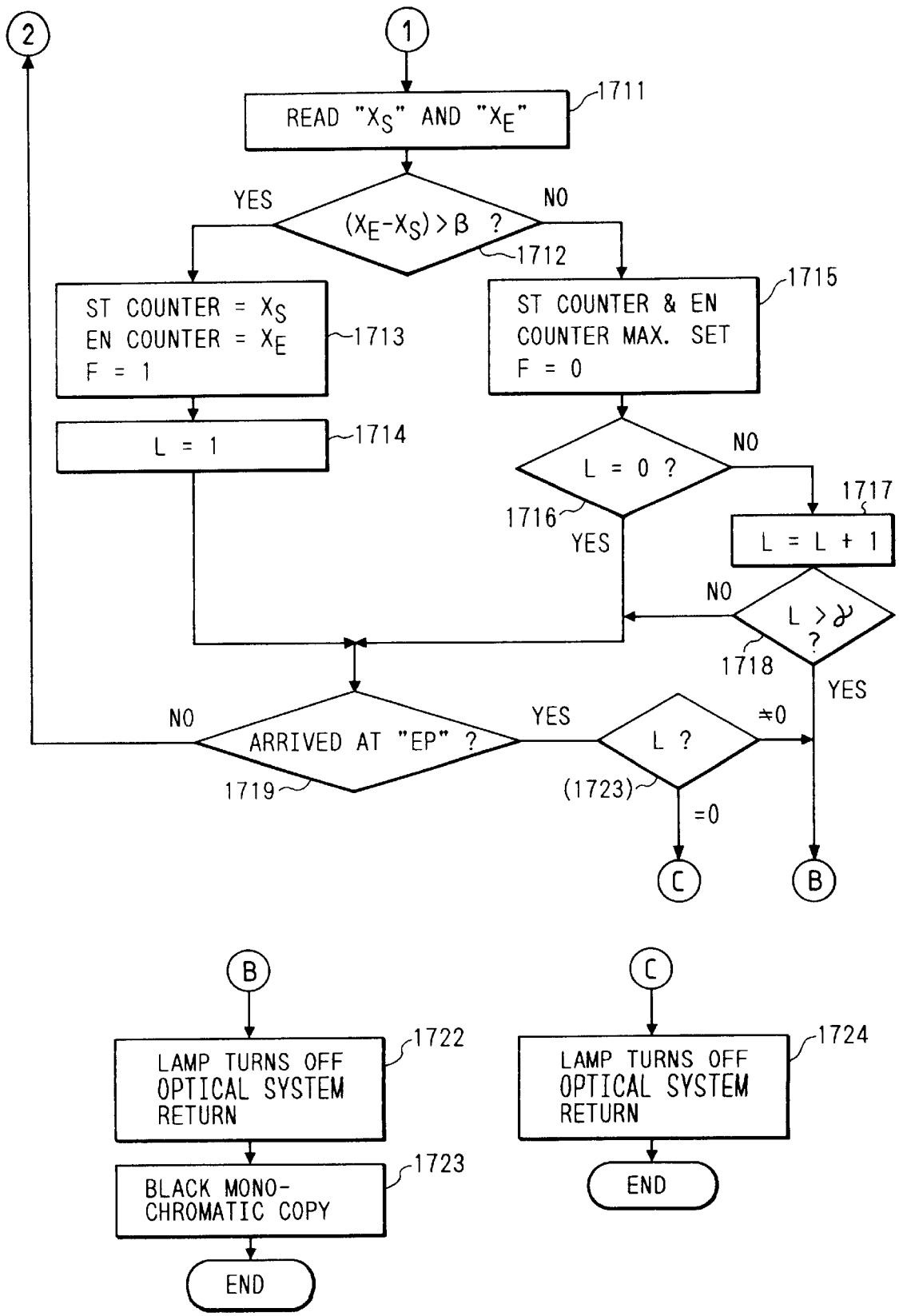
FIG. 17 is a flow chart of the control sequence of the fifth embodiment.

FIG. 17 shows the control sequence of the fifth embodiment.

At first a counter K formed in the RAM for cumulative counting of the colored pixels is initialized to zero, and a counter L formed in the RAM for counting the consecutive lines of an original-free section, is also initialized to zero (step 1701). Then two counters ST, EN for generating the section signal GATE explained in FIG. 3 are loaded with values larger than a main scan cycle, in order to prevent the generation of the GATE signal, and a state-indicating flag F in the RAM is set to "0" (step 1702). Then the optical system is started with the illuminating lamp on (step 1703), and, upon arrival thereof at the reference point SP of the platen (step 1704), the aforementioned EN signal is turned on (step 1705). Subsequently, upon second reception of the interruption signal INT1 at the down-shift of the HSYNC signal (step 1706), the EN signal is turned off (step 1707).

If the flag F indicating the control state of the GATE signal at the preceding interruption procedure is "1", namely if a section effective for the sample is set (step 1708), the count of the counter 304 shown in FIG. 3 is read through the latch 305 and is added, as the number of colored pixels, to the cumulative counter K (step 1709). If the count K is larger than a predetermined value α (step 1710), the pre-scanning is terminated, then the illuminating lamp is turned off and the optical system is returned to the start position (step 1720). Subsequently a color copying operation is conducted (step 1721).

If the flag F is "0" at the step 1708, the count is not read because the counting operation has not been conducted.

Then the original positions $X_S$, $X_E$ are read from two latches 409, 408 in the original position detecting circuit shown in FIG. 4 (step 1711), and, if $X_E-X_S$ is larger than a predetermined value f (step 1712), the presence of the original is identified. Thus the ST-counter and EN-counter are respectively loaded with $X_S$ and $X_E$ for defining the next section for counting the colored pixels, and the aforementioned flag F is set at "1" (step 1718). Also the counter L is loaded with "1", indicating the detection of the original at least once. If the value $X_E-X_S$ is smaller than β, signifying that the original has not been detected, the ST-counter and the EN-counter are loaded with values larger than a main scan section for prohibiting the count of the colored pixels, and the flag F is set at "0" (step 1715).

When the original cannot be detected, the count of the counter L is monitored (step 1716), and, if L is "0" indicating the absence of detection of the original so far, the count of the counter L is left unchanged.

If L is not "0", indicating a case in which the original is removed after detection at least once, the value L is increased by one (step 1717), and the original is identified removed if the value L exceeds a predetermined value γ (step 1718). Comparison with the predetermined value γ is a simplest method for noise elimination.

When the step 1718 identifies the removal of the original, the pre-scanning is terminated, then the lamp is turned off and the optical system is returned to the starting position (step 1722). Subsequently a black monochromic copying is conducted (step 1723).

If the sequence cannot escape from the loop of the steps 1705–1718 until the end point EP of the platen is reached (step 1719), the absence of the original is identified n case of L=0, so that the turning-off of the lamp and the returning of the optical system are conducted and the sequence is terminated without copying (step 1724). If L is not "0", there is conducted a black monochromic copying (steps 1722, 1723).

The image signal G2 for original position detection, obtained from the shading correction unit 102, and the image signals R3, G3, B3 for color determination, obtained from the shift memory 103, are so controlled that the former signal G2 is earlier by two lines at said shift memory 103. Consequently, the color determination section can be matched with the original position by reading the count of the colored pixels based on said signals R3, G3, B3 after two lines from the setting of the original section detected from the signal G2.

As explained in the foregoing, even when the position of the original is not known in advance, the color information of the original is determined by the information in the original area, and, when a color original is identified or when the original is removed, the pre-scanning is terminated, so that the time required for pre-scanning can be reduced.

Therefore, the copying time can be reduced by interrupting the pre-scanning when the original is identified as a color original and immediately conducting a color copying operation.

Also the copying time reduction can be realized even when the position of the original is not known in advance, by avoiding unnecessary color determining scan in an area where the original is absent.

In the foregoing embodiments, there is considered only one original or area to be subjected to color/black-and-white determination on the platen. However, in case of copying each of plural originals simultaneously placed on a platen, or copying each of plural areas defined in an original on the platen, the color/black-and-white determination is preferably conducted for each of such plural originals or areas in order to achieve a better efficiency and to obtain a better copy.

In the following there will be explained an embodiment for effecting the color/black-and-white determined in each of plural areas.

At first there will be explained another principle of original position detection in the original position detecting unit 110.

Figure 18B:
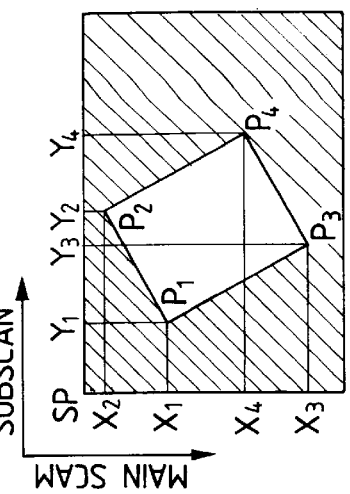
FIG. 18B is a view showing the state of an original.

Based on the aforementioned surface treatment of the pressure plate 200 and the usually white background of the original, the original position is obtained by detecting the position of white signals in black signals, utilizing suitably binarized brightness signal levels as shown in FIG. 18B.

Figure 18A:
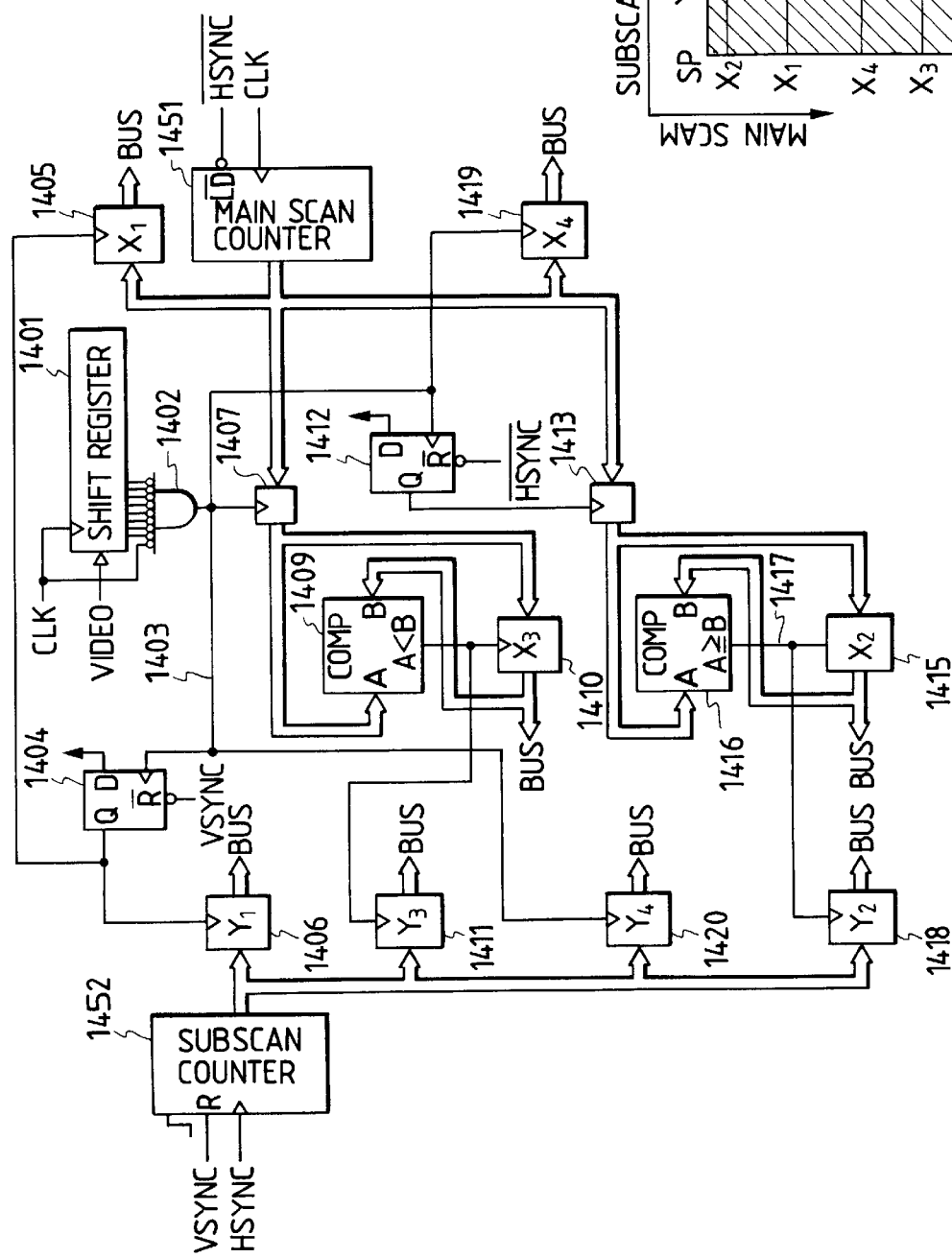
FIG. 18A is another block diagram of the original position sensing unit.

FIG. 18A shows a logic circuit for detecting the coordinates, as will be explained in the following.

A main scan counter 1451 is composed of a down-counter, and indicates the scan position in a main scan line. Said counter 1451 is set at a maximum value in the main scanning direction (X) in response to the horizontal synchronization signal HSYNC, and effects a down counting for each image data clock signal CLK. A sub scan counter 1452 is composed of an up-counter. It is reset at "0" at the upshift of an image front end signal VSYNC, and effects an up-counting at each HSYNC signal, thereby indicating the scan position in the sub scanning direction.

Binarized image data VIDEO obtained by pre-scanning are entered, in the unit of 8 bits, into a shift register 1401. Upon entry of 8 bits, a gate circuit 1402 discriminates whether all 8 bits are white pixels, and, if so, releases a signal "1" to a signal line 1403. At the appearance of first eight white bits after the start of scanning operation, a flip-flop 1404, which is reset in advance by the VSYNC signal, is set and remains in the set state until the next VSYNC signal is received. In response to the setting of the flip-flop 1404, a latch flip-flop 1405 is loaded with the current value of the main scan counter 1451, as the coordinate value $X_1$. Also a latch 1406 is loaded with the current value of the sub scan counter 1452, as the coordinate value $Y_1$. In this manner $P_1(X_1, Y_1)$ can be determined.

In response to each signal "1" on the signal line 1403, a latch 1407 is loaded with the value of the main scan counter 1451. At the appearance of first eight white bits, the value of the main scan counter is loaded in a latch 1407 and is compared, in a comparator 1409, with the value of a latch 1410 which is set at the maximum value in the X-direction in response to the VSYNC signal. If the value of the latch 1407 is smaller, it is loaded in a latch 1411. At the same time, the value of the sub scan counter 1452 is loaded in the latch 1411. These operations are completed before the entry of next eight bits into the shift register 1401. The data of the latches 1407 and 1410 are processed as explained above over the entire image area, whereby the latch 1410 retains the minimum value in the X-direction in the original area, while the latch 1411 retains the corresponding Y coordinate. Since the main scan counter 1451 is a down-counter, the coordinate corresponding to the minimum value in the X-direction indicates the farthest coordinate from the point SP in the main scanning direction, namely $P_3(X_3, Y_3)$.

A flip-flop 1412 is reset by the horizontal synchronization signal HSYNC, then set at the appearance of first eight white bits in each main scanning line, and remains set until next HSYNC signal. In response to said setting of the flip-flop 1412, a latch 1413 is loaded with the value of the main scan counter 1451 corresponding to the position of the white signal appearing first in a line, and said value is compared, in a comparator 1416, with the value of a latch 1415 which is loaded with the minimum value "0" in the X-direction in response to the VSYNC signal.

If the value of the latch 1415 is smaller than or equal to that of the latch 1413, a signal 1417 is activated to load the value of the latch 1413 into the latch 1415. These operations are conducted in the interval between the HSYNC signals.

The above-explained comparison is conducted over the entire image area, whereby the latch 1415 retains the maximum value of the original coordinate in the X-direction, namely the X-coordinate of a white signal closest to the scan start point in the main scanning direction. Said coordinate is $X_2$.

Also at the activation of the signal line 1417, the value of the sub scan counter 1452 is loaded in a latch 1418 as $Y_2$. In this manner the coordinate $P_2(X_2, Y_2)$ can be determined.

Latches 1419 and 1420 are respectively loaded with the values of the main scan counter and the sub scan counter at every appearance of eight white bits over the entire image area. Consequently, at the end of the pre-scanning, the counters retain the counts at the last appearance of such eight white bits. These counts define $P_4(X_r, Y_4)$.

The data lines of the foregoing eight latches 1406, 1411, 1420, 1418, 1405, 1410, 1415 and 1419 are connected to the bus line of the CPU 113 shown fin FIG. 1 so that the CPU 113 can read the data of these latches at the completion of the pre-scanning.

Figure 19:
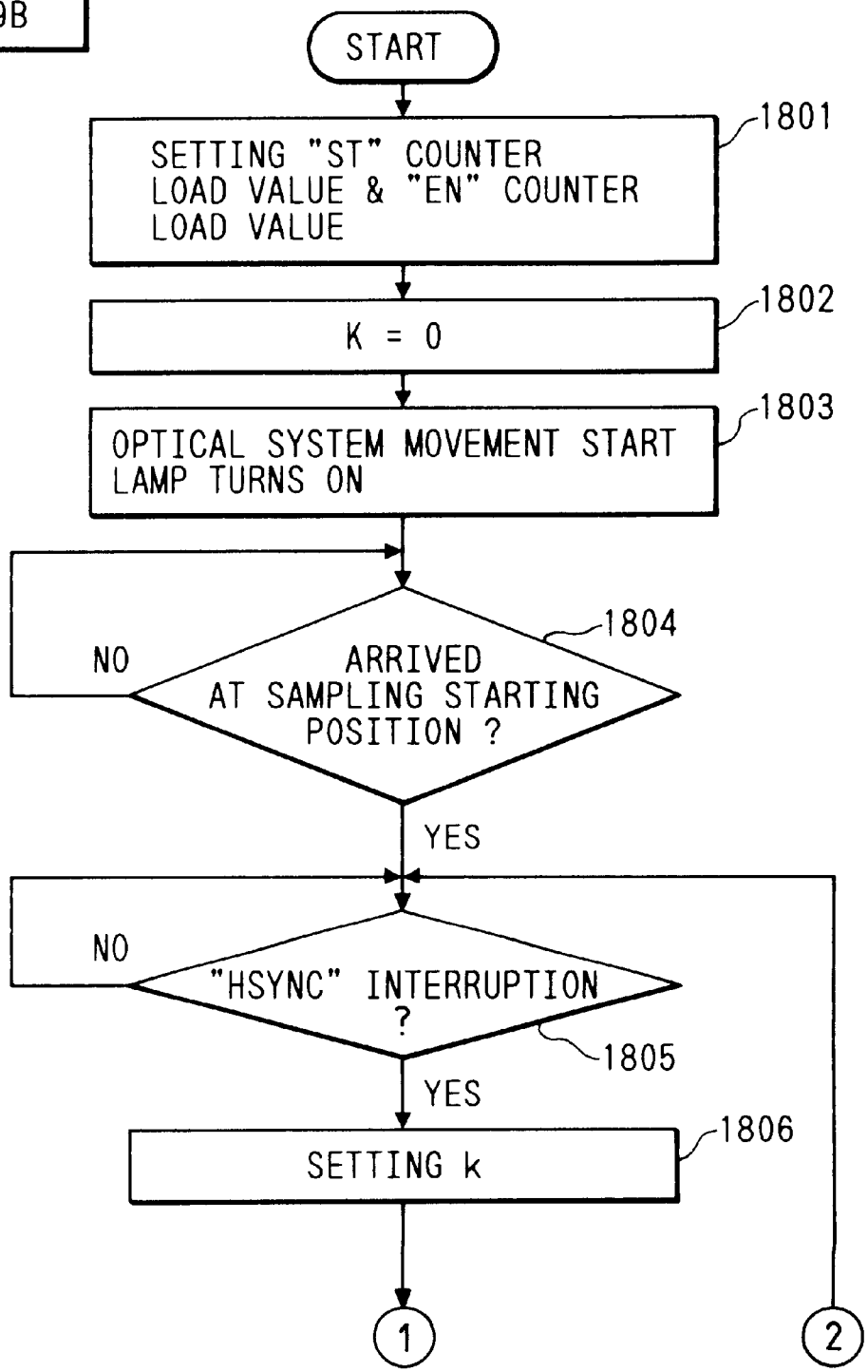
FIG. 19 is a flow chart for original determination.
Figure 19B:
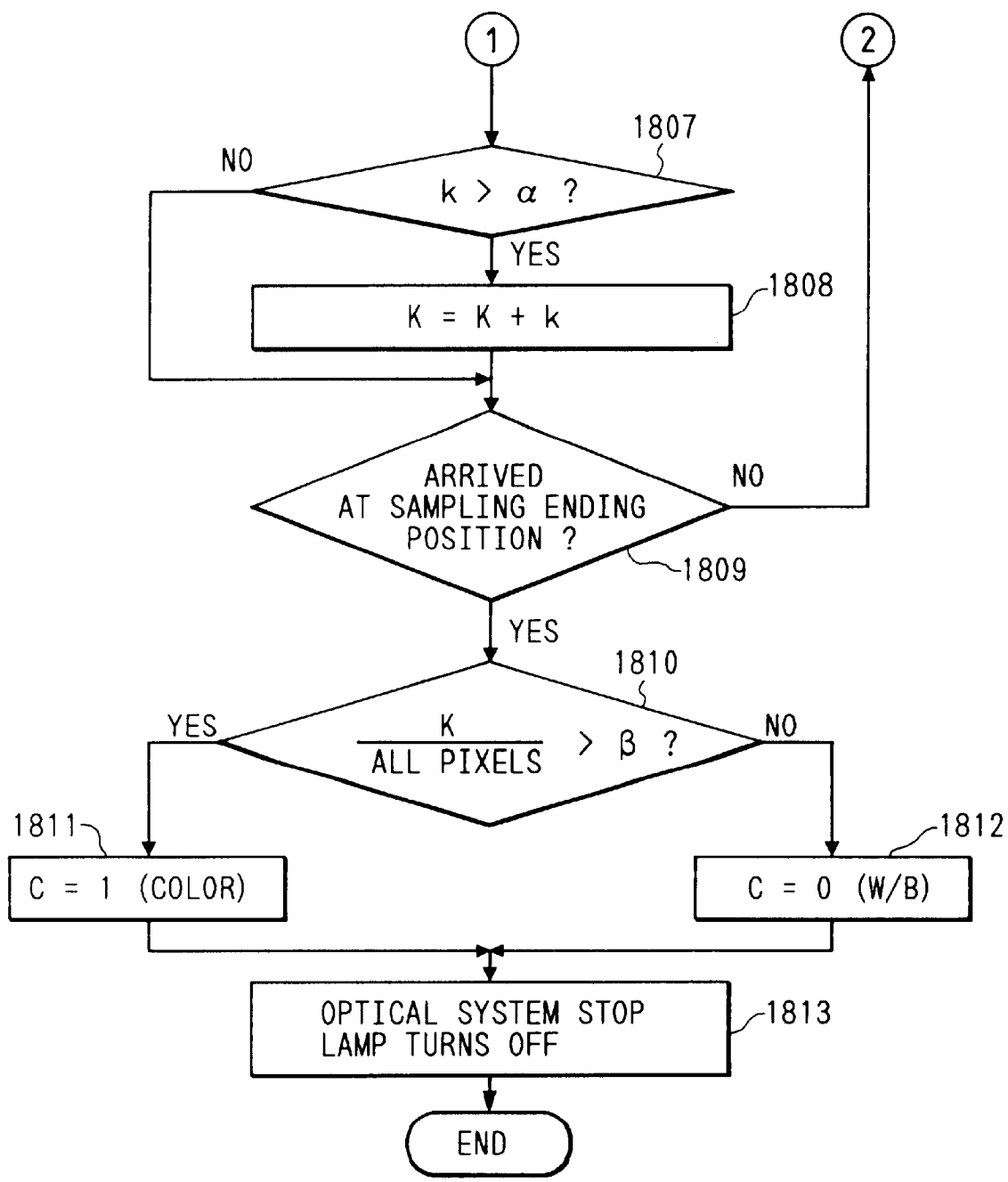

FIG. 19 shows the basic control sequence for the color determination of the original in the present sixth embodiment.

At first the loaded value of the ST-counter 309 for controlling the section of determination in a latch 307, and the loaded value of the EN-counter 310 is set in a latch 308 (step 1801). Then the RAM counter K for cumulative counting of the colored pixels is initialized to "0" (step 1802).

Then the illuminating lamp and the optical system are activated (step 1803). When the optical system reaches the sampling start point in the sub scanning direction (step 1804), the CPU 113 awaits the interruption by the horizontal synchronization signal HSYNC (step 1805), and, upon receiving said interruption, reads the count of the counter 304 from the latch 305 and sets said count in a buffer k formed in the RAM (step 1806). If k is larger than a predetermined pixel number α (step 1807), k is added to the cumulative counter K (step 1808). Said a is a simplest method of noise elimination. This adding operation is continued until the arrival at the sampling end point (step 1809).

Upon completion of the sampling operation, the ratio of the added result K to the total number of pixels used for determination is calculated and is compared with a predetermined value S (step 1810). A color original is identified if the former is larger, and a signal for example "1" is set in a RAM area C (step 1811). Also a black-and-white original is identified if the former is smaller, and a signal for example "0" is set in the RAM area C (step 1812).

Subsequently the optical system is stopped and the lamp is turned off to terminate the color determination operation.

The above-mentioned determination by the ratio of K to the total pixel number is just an example, and there may also be employed a method of simply comparing K with a predetermined value.

Figures 1, 20:
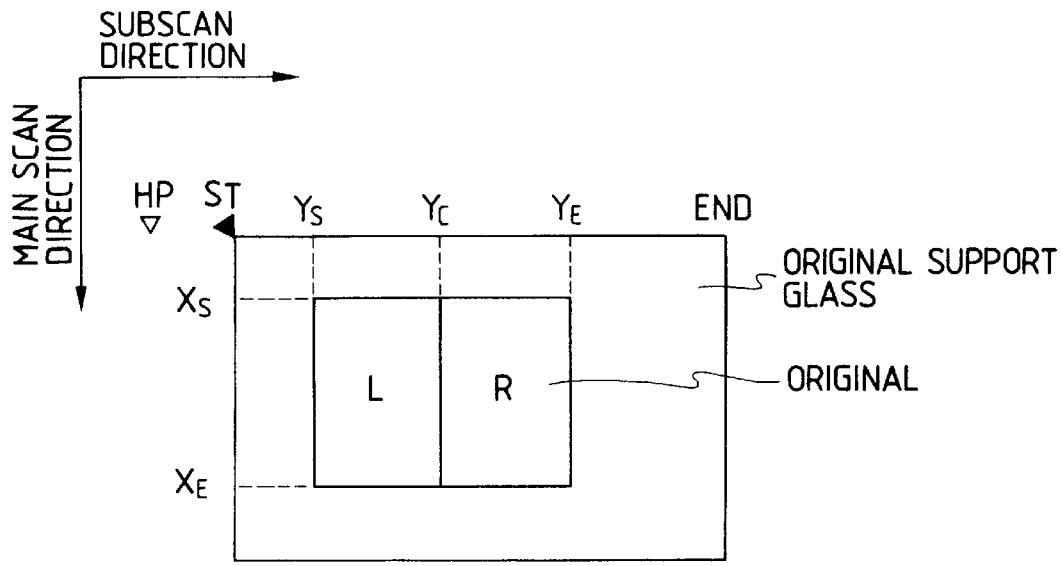
Figures 2, 20:
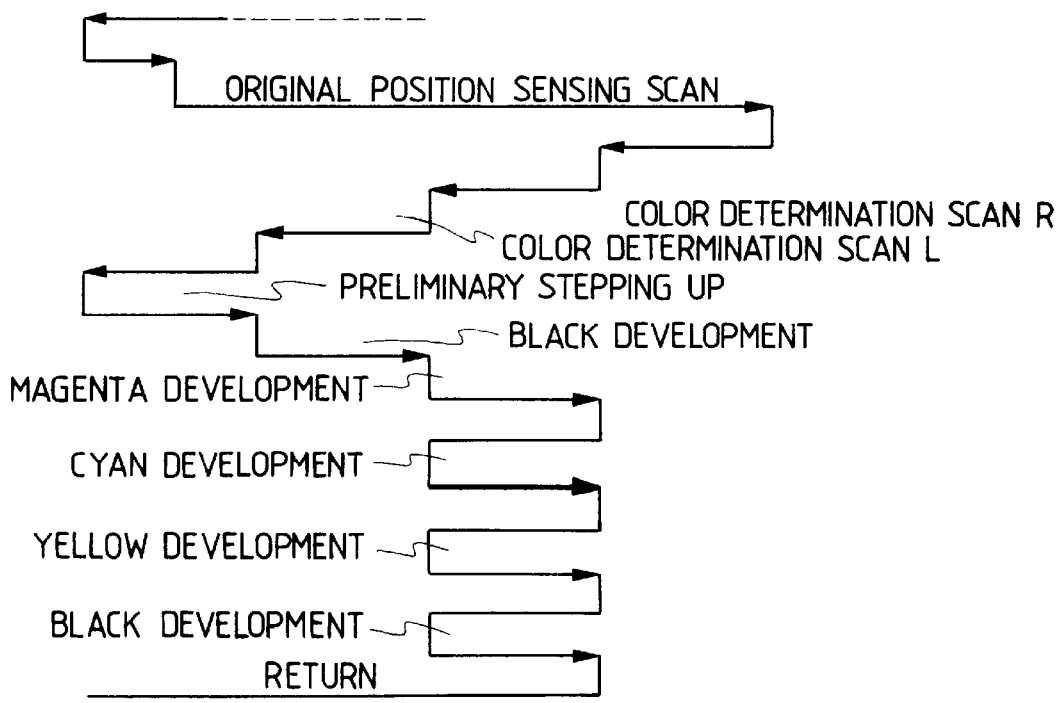

FIG. 20-1 shows an original placed on the glass plate 203. In case of dividing said original into two areas L and R and color copying these areas respectively on different sheets, there has conventionally been employed a method of scanning the area L four times for four-color developments and then scanning the area R four times for four-color developments. However, if the original consists of a book in which the left page contains black-printed text only while the right page contains a color photograph, it is uneconomical in time and cost to copy the left page in full color.

Therefore, there is employed a method, as shown in FIG. 20-2, of at first scanning the entire area of the glass to detect the position of the original, then effecting the color determination on the right area R of the original, and effecting the color determination on the left area L. If said areas L and R are respectively identified, for example, as a black-and-white original and a color original, a black copying operation is conducted for said area L and a color copying operation is conducted for said area R.

Figures 21, 21A:
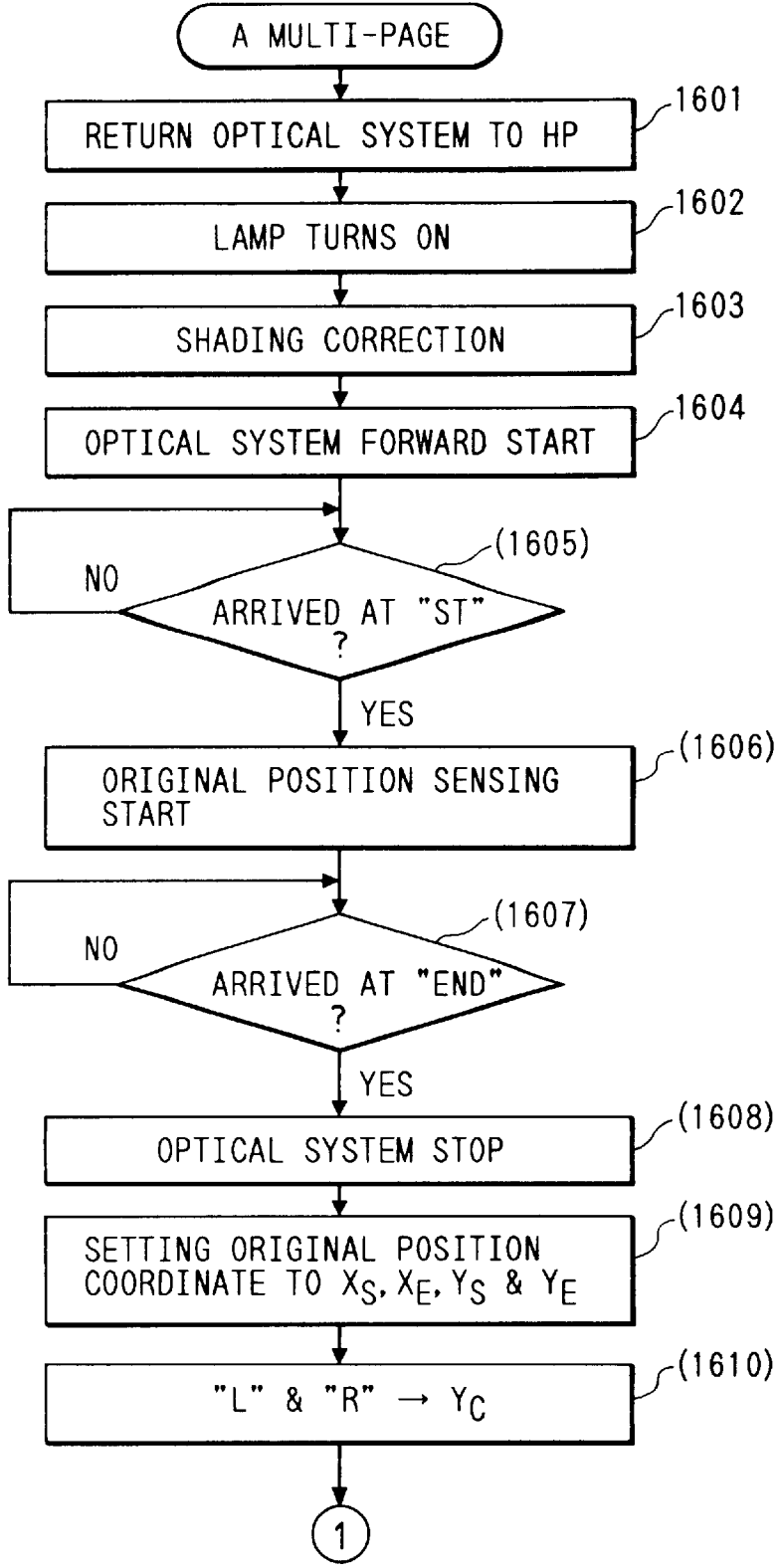
FIG. 21 is a flow chart of the control sequence of the sixth embodiment.
Figure 21B:
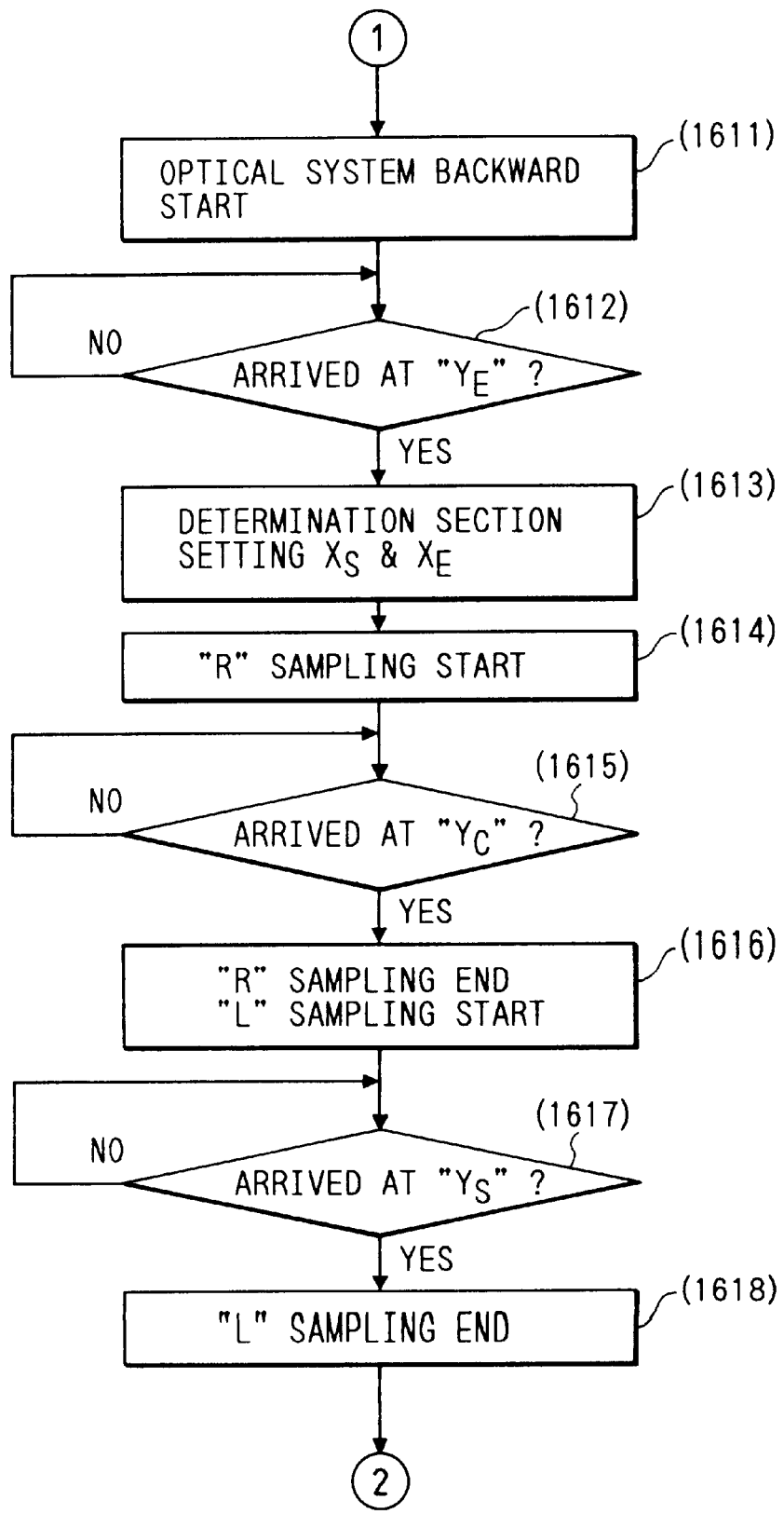
Figure 21C:
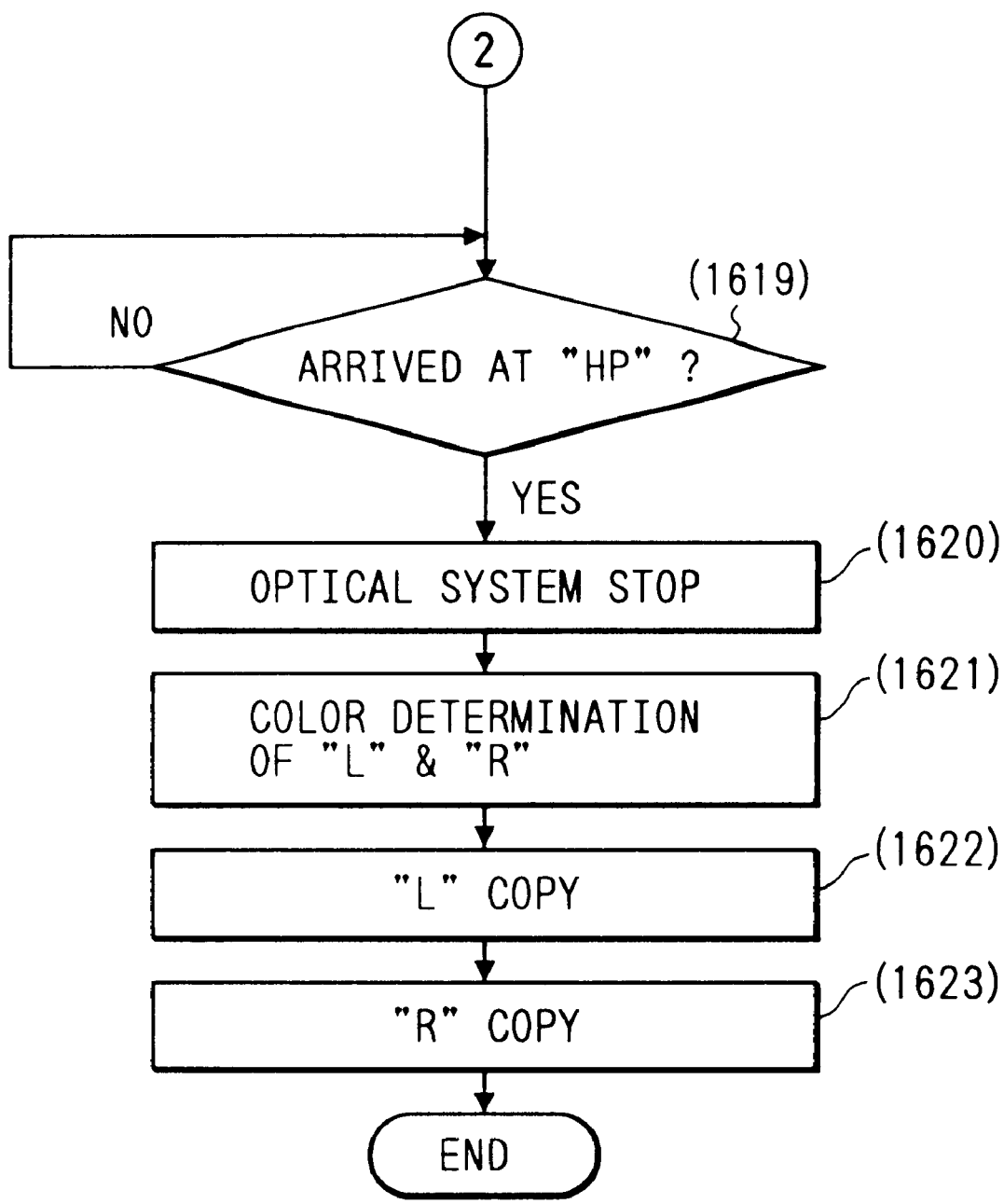

FIG. 21 shows the control sequence for realizing the operation shown in FIG. 20-2.

At first the optical system is returned to a home position HP (6-1 in FIG. 6) (step 1601). Then the illuminating lamp is turned on (step 1602), and shading correction is executed (step 1603). The optical system is put into forward motion (step 1604), and, upon arrival at the reference point ST of the platen (step 1605), the detection for the position of original is started (step 1606). Then, upon arrival at the end point END of the platen (step 1607), the optical system is stopped (step 1608) and the detected coordinates of the original position are set in RAM areas XS, XE, YS, YE (step 1609), corresponding to those shown in FIG. 6-1.

Then the coordinate dividing the original into two areas is determined by (YS+YE)/2 and is set in a RAM area YC (step 1610).

Now the optical system is put into reverse motion (step 1611). Upon arrival at the position YE, the main scan positions AS, XE of the original are set in latches (307, 308 in FIG. 3) for defining the afore-mentioned color determining section (step 1613), and the sampling of the color determining data of the right area R is started (step 1614). Upon arrival of the optical system at the position YC (step 1615), the sampling is terminated for the area R and started for the area L (step 1616). Then, upon arrival at the position YS (step 1617), the sampling for the area L is terminated (step 1618), and, upon arrival of the optical system at NP (step 1619), the scanning is stopped (step 1620).

Then the black-and-white/color determination is conducted independently for the area L and area R, based on the result of sampling (step 1621), and the copying operations of the area L (step 1622) and of the area R (step 1623) are conducted according to the results of said determinations. Thus continuous page copying is completed.

The concept of this sixth embodiment is applicable to a case in which two or more areas are present in an original, not mutually overlapping in the sub scanning direction, by switching the determining section signal in a single sampling scan for color determination, corresponding to said plural areas.

Figures 1, 22:
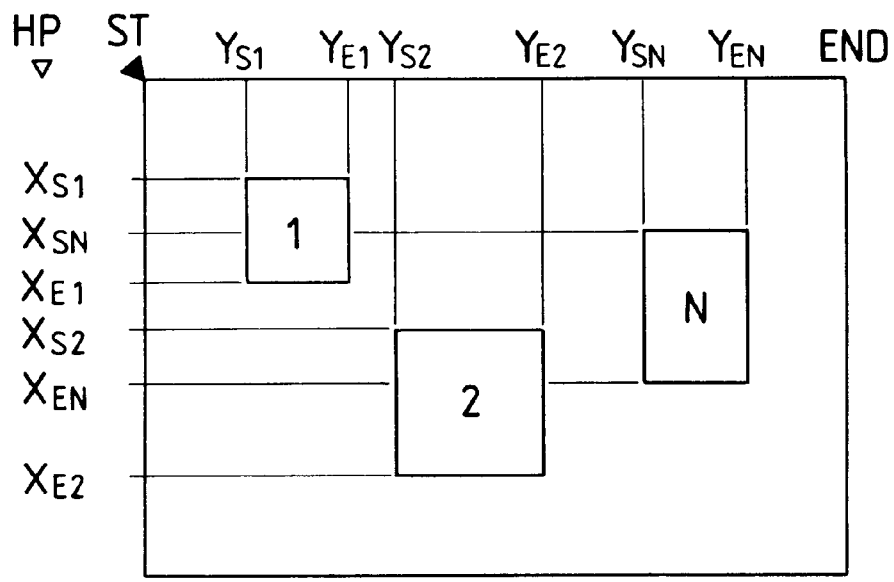
Figures 2, 22:
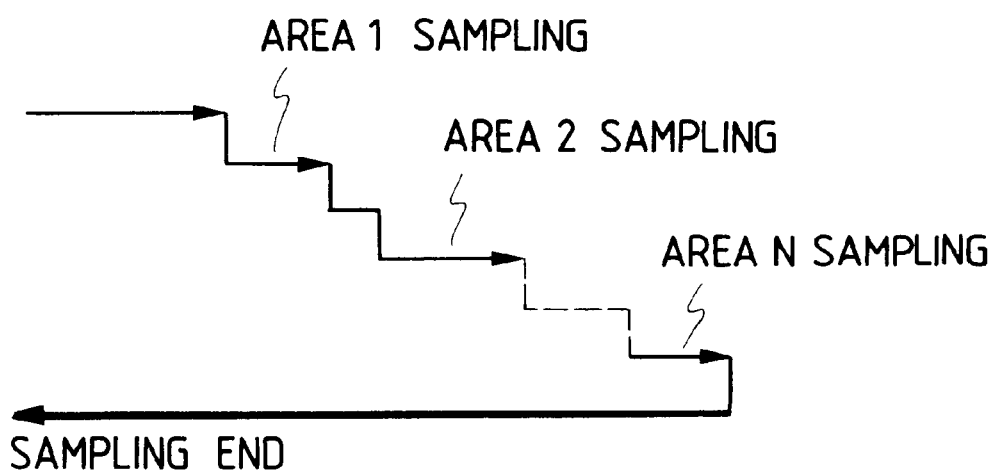

FIG. 22 shows an example of such expansion, in which N areas are separately present in an original. In this example, the coordinates of the areas are assumed to be known in advance. While the optical system is present between YS1 and YE1 corresponding to a first area, the determining section is defined by XS1 and XE1 for effecting the sampling for the area 1. Then, while the optical system is present between YS2 and YE2 corresponding to a second area, the determining section is defined by XS2 and XE2 to effect the sampling for the area 2, and the operations are similarly continued until the area N.

The foregoing embodiment is effective for a case in which plural areas present in an original do not mutually overlap in the sub scan direction. In the following there will be explained a seventh embodiment in which two or more areas overlap in the sub scan direction.

Figures 1, 23:
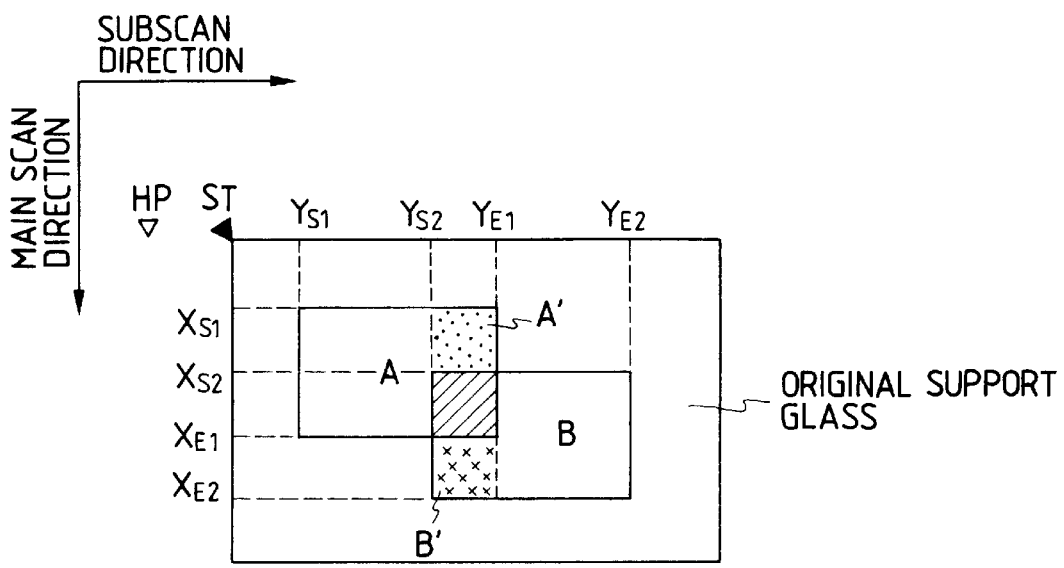
Figures 2, 23:
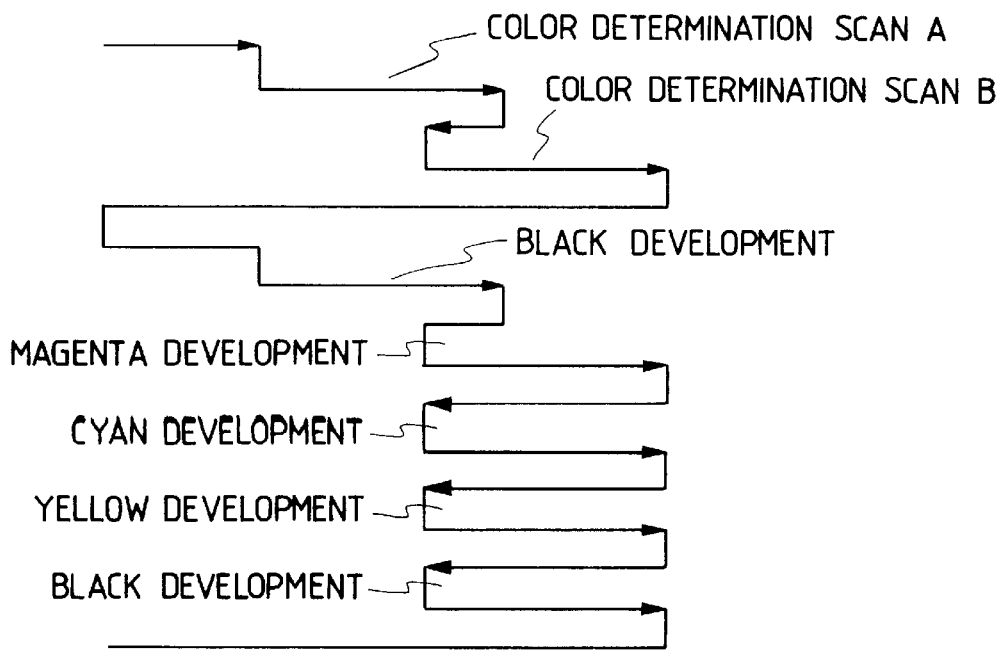

FIG. 23 shows the concept of the seventh embodiment. As shown in FIG. 23-1, two areas A and B mutually overlap in a hatched portion. For such case, the first embodiment, if applied, is unable to effect proper determination for each area, in a section between the sub scanning positions YS1 and YE1. More specifically, if the main scanning determination section is defined by XS1 and XE2 between YS2 and YE1, the area A cannot be properly identified even it is a black area if the area B' contains a color component. On the other hand, if the determination section is defined by XS1 and XE1 between YS2 and YE1, the area B cannot be properly identified because the information of the area B' cannot be sampled.

In such case, a proper determination is possible by a sequence as shown in FIG. 23-2.

At first a determination sampling scan is conducted in the area A. Then the sub scanning position returns from YE1 to YS2, and a determination sampling scan is conducted in the area B. Then, according to the result of determination for each area, a black monochromic copying operation is conducted for the area A and a color copying operation is conducted for the area B.

Figure 24:
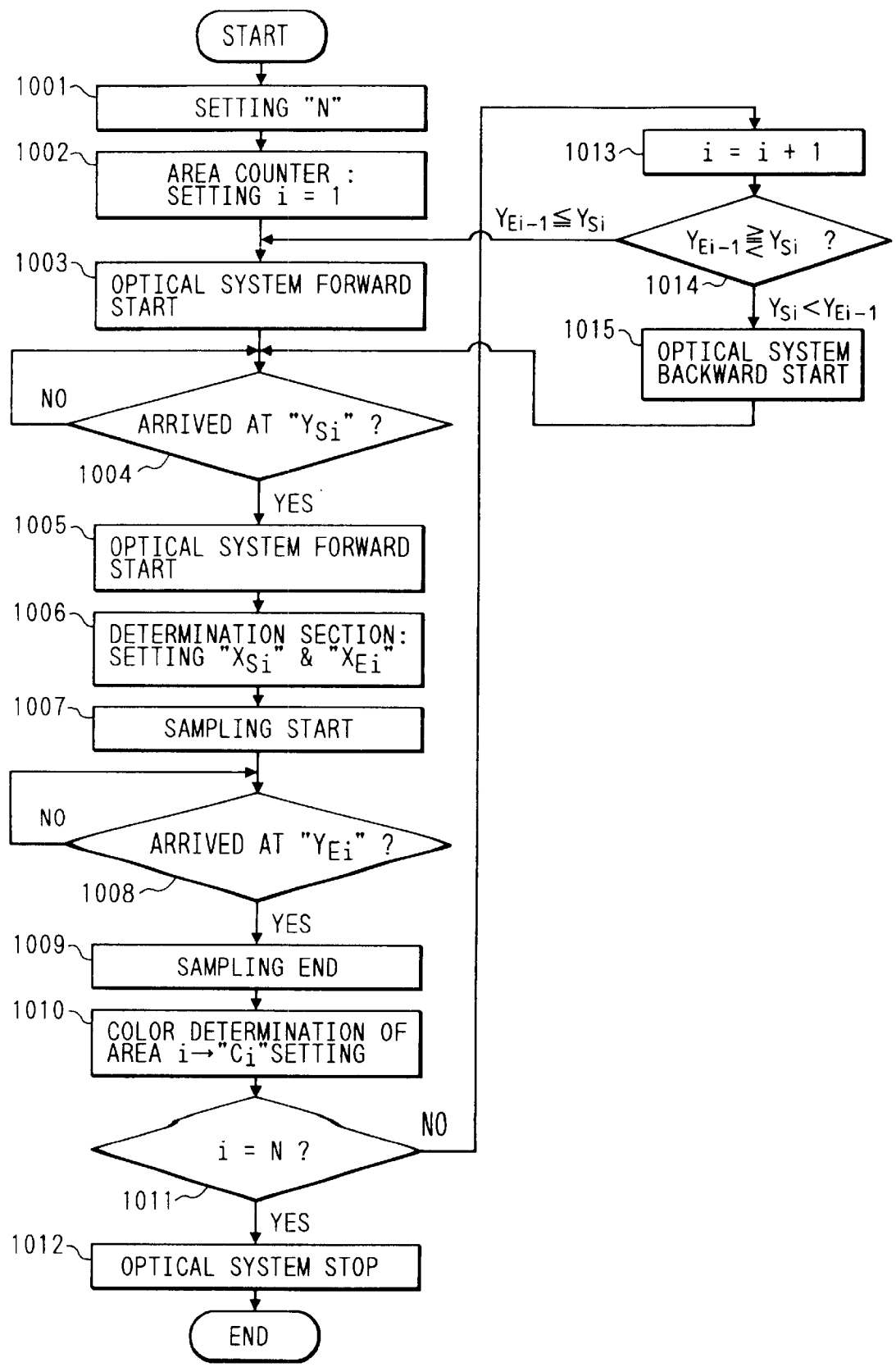
FIG. 24 is a flow chart of the control sequence of the seventh embodiment.

FIG. 24 shows the control sequence of sampling scans in case of copying arbitrary plural areas in an original onto different sheets.

At first the number of areas is set in a RAM area N (step 1001), and a RAM counter i for counting the area number is initialized to "1" (step 1002). Then the optical system is put into forward motion (step 1003), and, upon arrival at the sub scanning position $YS_i$ (step 1004), $XS_i$, $XE_i$ are set for defining the determining section in the main scanning section (step 1006). The data sampling is then started (step 1007), and, upon arrival of the optical system at YE1 (step 1008), the sampling is terminated (step 1009). Then the black-and-white/color determination conducted for the area i based on the sampled data, and the result is set in a RAM area Ci (step 1010).

Then there is discriminated whether the count of the counter i has reached the number N of the areas (step 1011). If not, the count of the counter i is increased by one (step 1013), then the current position $YE_{i-1}$ is compared with the sub-scanning front end coordinate $YS_i$ of the next area (step 1014), and, if $YS_i < YE_{i-1}$, namely if the present position is at the downstream side, the optical system is reversed (step 1015) until it reaches $YS_i$ (step 1004). On the other hand, if $YE_{i-1} \leq YS_i$, namely if the next determination area is positioned downstream of the present position, the optical system is forwarded (step 1003) until $YS_i$ is reached (step 1004).

Thereafter the determining sampling scans are repeated for all the areas, then the results are stored in the RAM, and black monochromic copying or color copying is conducted according to said results.

The seventh embodiment however becomes inefficient since the time required for sampling scan increases with the increase in the number of overlapping areas. In the following there will be explained an 8th embodiment shown in FIG. 25 and effective for N areas which may overlap.

Figure 25:
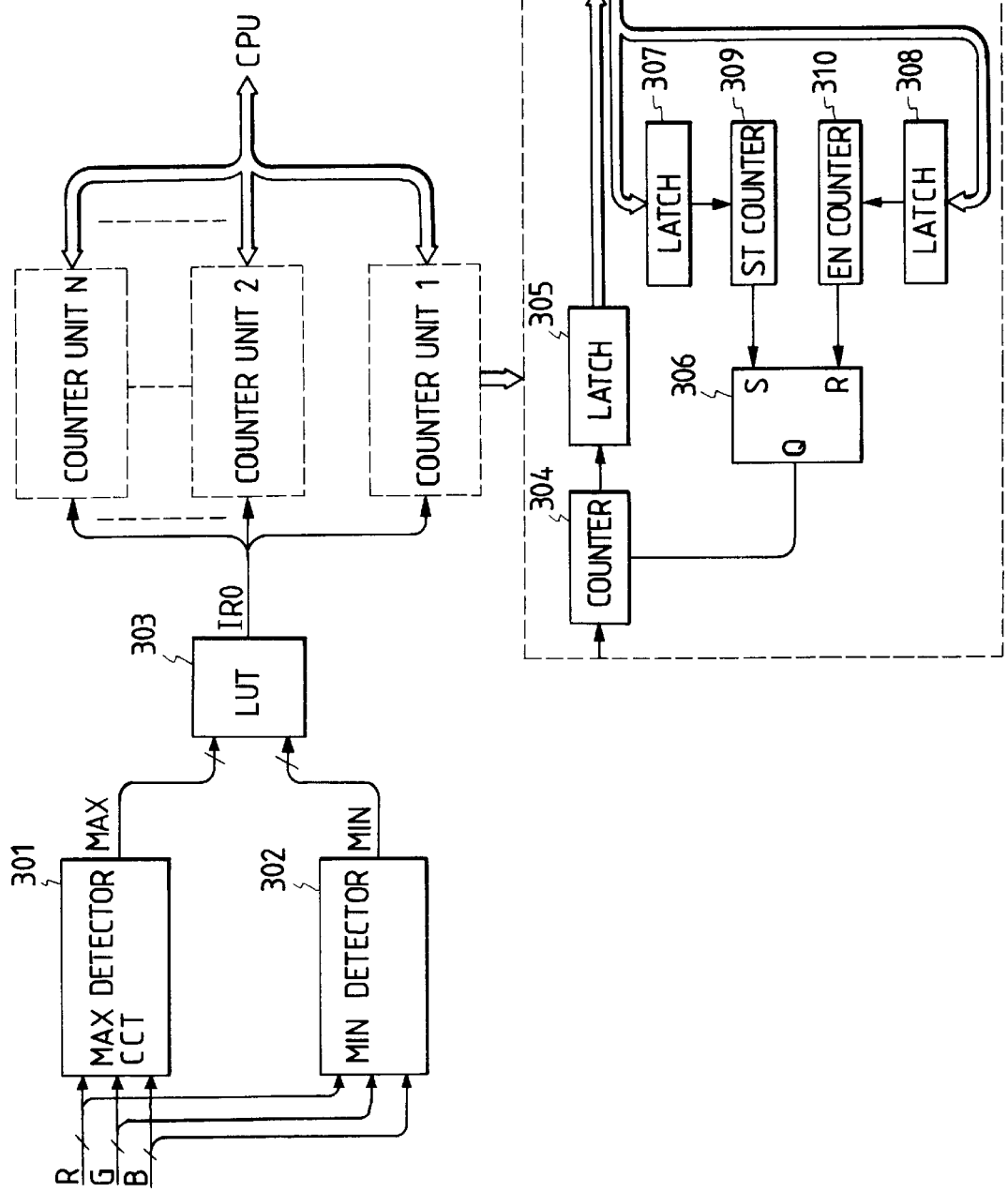
FIG. 25 is a block diagram of the color determination unit of an eighth embodiment.

FIG. 25 is a block diagram of a structure corresponding to the color determination unit shown in FIG. 3A and employed in the foregoing first to seventh embodiments.

The structure shown in FIG. 23 is provided with N parallel sets of counter units each corresponding to the counters 304–310 shown in FIG. 3. This structure enables independent sampling in N sections at maximum arbitrarily defined on the main scanning line.

Figure 26:
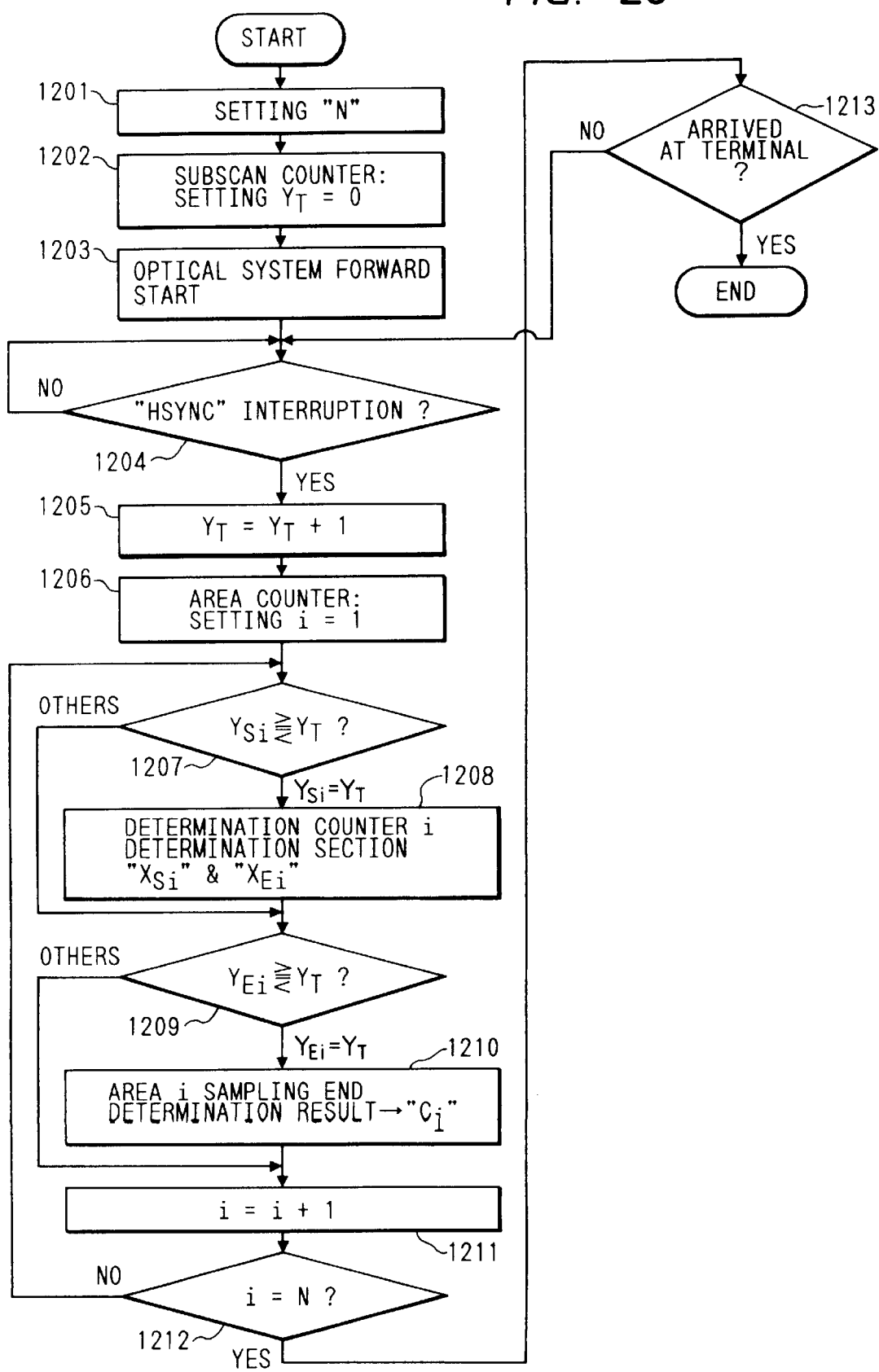
FIG. 26 is a flow chart of the control sequence of the eighth embodiment.

FIG. 26 shows the control sequence of the determination sampling scans in the 8th embodiment.

At first the number of areas is set in a RAM area N (step 1201), then a RAM counter $Y_T$, for counting the scan position in the sub scanning direction, is initialized to "0" (step 1202), and the optical system is put into forward motion (step 1203). Subsequently the CPU awaits the interruption by the horizontal synchronization signal HSYNC (step 1204), and the count of the counter $Y_T$ is increased by one at each interruption (step 1205).

Also a RAM counter i, for applying the sequence starting from a step 1207 to all the N areas, is initialized to "0" (step 1206). When the current position $Y_T$ of the optical system is equal to the front end $YS_i$ of an area i (step 1207), XSi, XEi are set as the determining section in a determination counter i shown in FIG. 25 corresponding to the area number i (step 1208), and the sampling is started. If the current position $Y_T$ is equal to the rear end YEi of the area i (step 1209), the sampling for the area i is terminated, and the result of determination obtained from the sampled data is set in a RAM area Ci (step 1210). The above-explained steps 1207–1210 are repeated with successive increments of the value i (step 1211) until all the areas are covered (step 1212), and the next interruption by the HSYNC signal is awaited. Then the steps 1204–1212 are repeated until the optical system reaches the end of the platen, and the sampling scan is terminated.

As explained above, presence of N counters for color determination enables proper sampling and determination in N independent areas at maximum in the main scanning line.

In the sequence shown in FIG. 26, the determination section is set by referring to the coordinates of the areas at each interruption, but the time required for interruption procedure can be reduced if a schedule table is prepared in advance for enabling time-sequential accesses, based on the positional relationship of all the areas.

Figures 1, 2, 27:
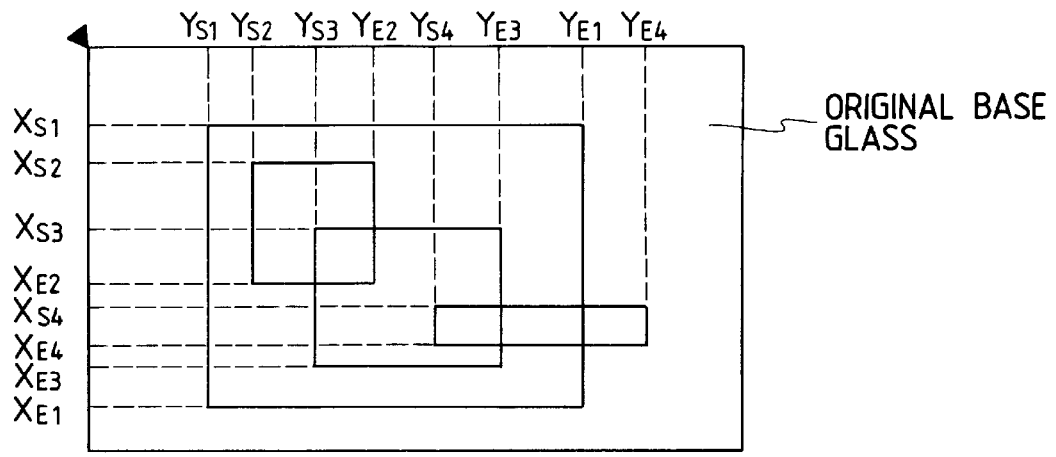

FIGS. 27-1 and 27-2 show an example of such schedule table. FIG. 27-1 shows an example the original having four areas, and FIG. 27-2 shows a corresponding schedule table.

As the sub scanning coordinate increases with the increase of the table address, the correspondence to only one table address is required at each interruption. Also each table address contains an area number corresponding to the sub scanning coordinate, start/end information indicating whether the area either starts or ends at said coordinate position by "0" or "1", and determination section information for setting the main scanning section in case the area starts from said position.

As explained in the foregoing, proper sampling and determination can be achieved in a single sampling scan, for two or more overlapping areas.

In the following there will be explained a ninth embodiment in which two or more areas present on a main scanning line are sampled with a set of determination counter shown in FIG. 3.

Figure 28:
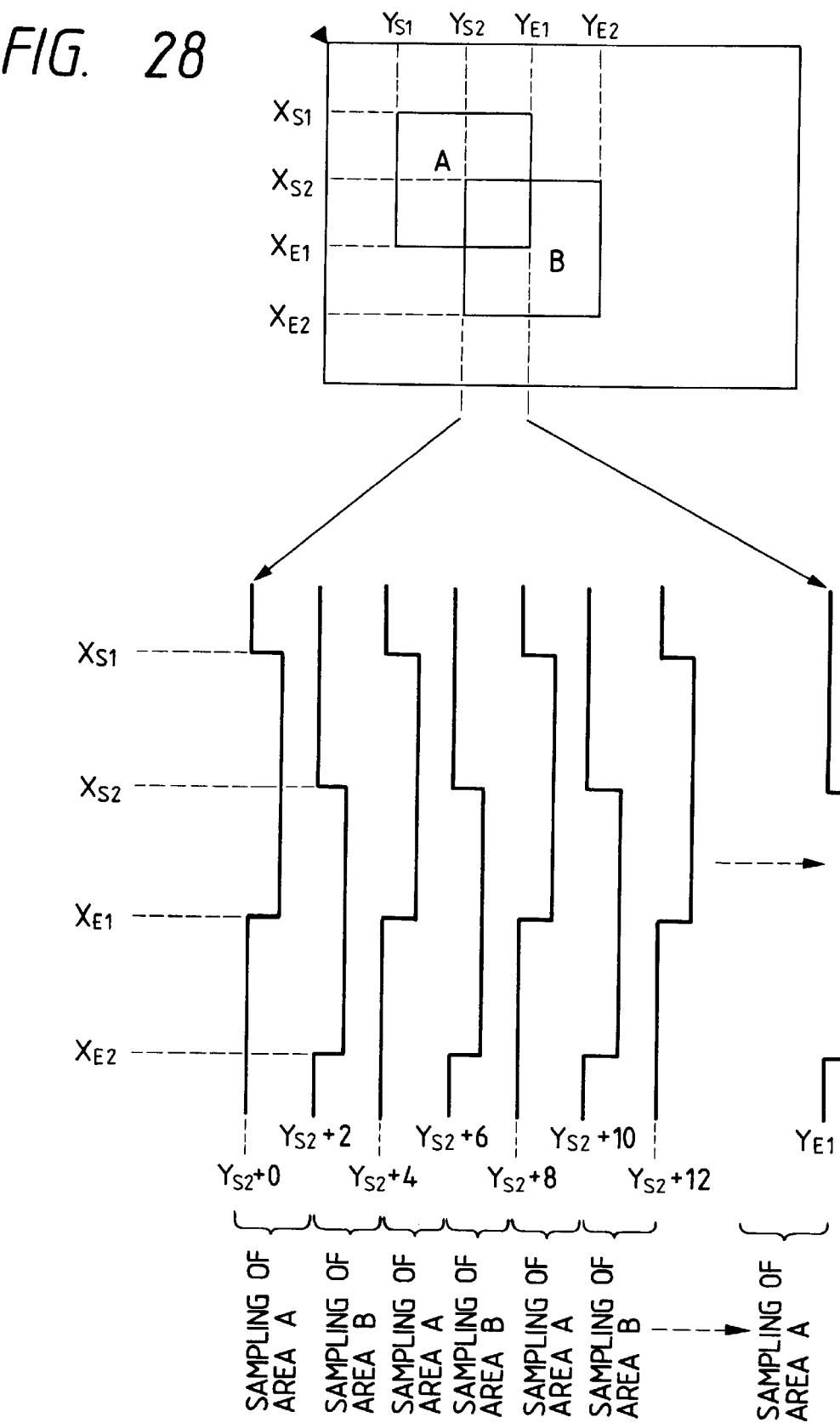
FIG. 28 is a schematic view of a ninth embodiment.

FIG. 28 shows the concept of said ninth embodiment.

FIG. 28 shows a case with partially overlapping two areas. In the overlapping section between YS2 and YE1, the sampling section is switched between (XS1, XE1) and (XS2, XE2) for example in every two lines.

More specifically, when the optical system reaches a position YS2+0, a sampling section (XS1, XE1) for the area A is set. Then, when the optical system reaches a position YS2+2, the data sampled on the area A are fetched, and a sampling section (XS2, XE2) for the area B is set. Subsequently, when the optical system reaches a position YS2+4, the data sampled on the area B are fetched, and the operation is thereafter repeated in a similar manner. This concept is generalized in a control sequence shown in FIG. 29.

At first number of the areas is set in a RAM area N (step 1502), and then a RAM counter $Y_T$ for counting the sub scanning position, RAM buffers Ki (i=1, 2, 3, . . . , N) for cumulative addition of the counts for respective areas obtained from the determination counter, and a RAM counter i for successive accesses to N areas are all initialized to "0" (step 1503).

Then, after the start of forward motion of the optical system (step 1504), there is awaited the interruption by the HSYNC signal (step 1505), and the count of the sub scanning counter $Y_T$ is increased by one in response to each interruption (step 1506). Then the determination count in the determination section set in the preceding interruption is read, and added to a buffer Ki corresponding to the area i (step 1507). However, at the first interruption, said addition is not conducted because i=0. After said read-out of the count, the count of the area counter is increased by one (steps 1508–1510), and there is discriminated whether the next area contains the current sub scanning position, namely whether $YS_i \leq Y_T \leq YE_i$ stands (step 1511). If this condition is satisfied, $XS_i$ and $XE_i$ are set for defining the determination section for the sampling of the area i (step 1512), and the next interruption by the HSYNC signal is awaited (step 1505).

If the condition of the step 1511 is not satisfied, the sequence returns to the step 1508 to discriminate whether the current position is included in a next area.

However, for an interruption, there are conducted discriminations of N times at maximum, namely only one discrimination for each of N areas (steps 1511, 1515). If the aforementioned condition is not satisfied in any of N discriminations, i=0, is set for prohibiting the count addition in the steps 1516, 1507.

As explained above, in a sub scanning section in which two or more areas are overlapping, the sampling operation is conducted in succession for each of such overlapping areas at each interruption procedure. In a non-overlapping section, the sampling is conducted for the corresponding area at each interruption procedure.

When the optical system reaches the end position by repeating the above-explained operation (step 1513), the color determination is conducted for each area based on the results of addition Ki (i=1, 2, . . . , N), and the results of said determination are set in the RAM areas Ci (i=1, 2, . . . , N) (step 1514), whereby the sampling operation is terminated.

Figure 29B:
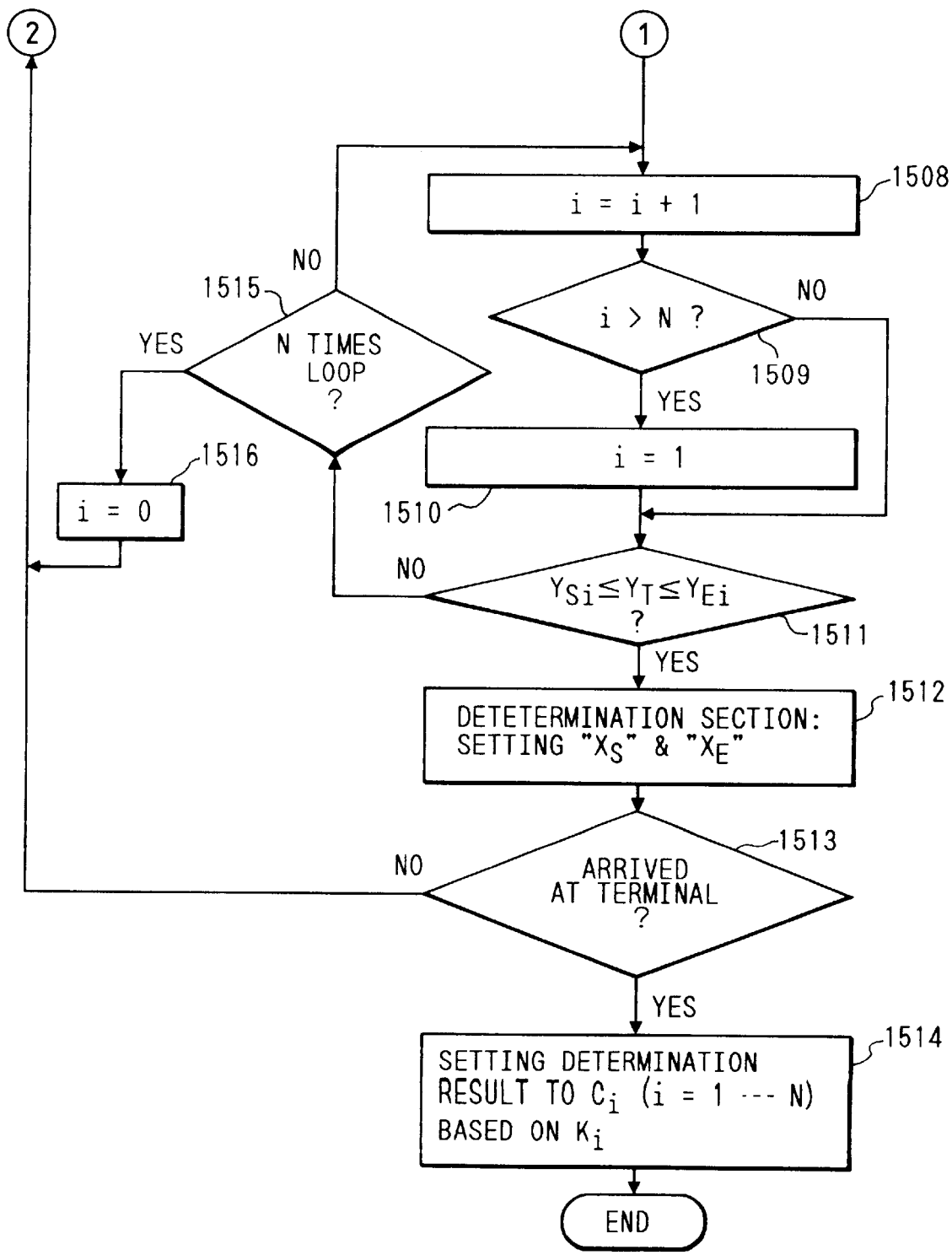
FIG. 29 is a flow chart of the control sequence of the ninth embodiment.

In the sequence shown in FIG. 29 the interruption takes place in every line. However, the interruption may be conducted at every predetermined number of lines allowing to establish the count in the sampling operation after the determination section is fixed, and, even in such case, the concept shown in FIGS. 28 and 29 is likewise applicable.

The foregoing sixth embodiments are effective in case the area to be sampled is known in advance, but the sampling scan has to be repeated if the areas on a single original are different for each copy. In a following tenth embodiment, the area of the original is divided into small areas of a suitable size, and the result of determination is stored for each of said small areas. Thus, when a new area is selected, the color determination of said new area is achieved, without the sampling scan, from the results of determination of the small areas included in said new area.

Figures 1, 30:
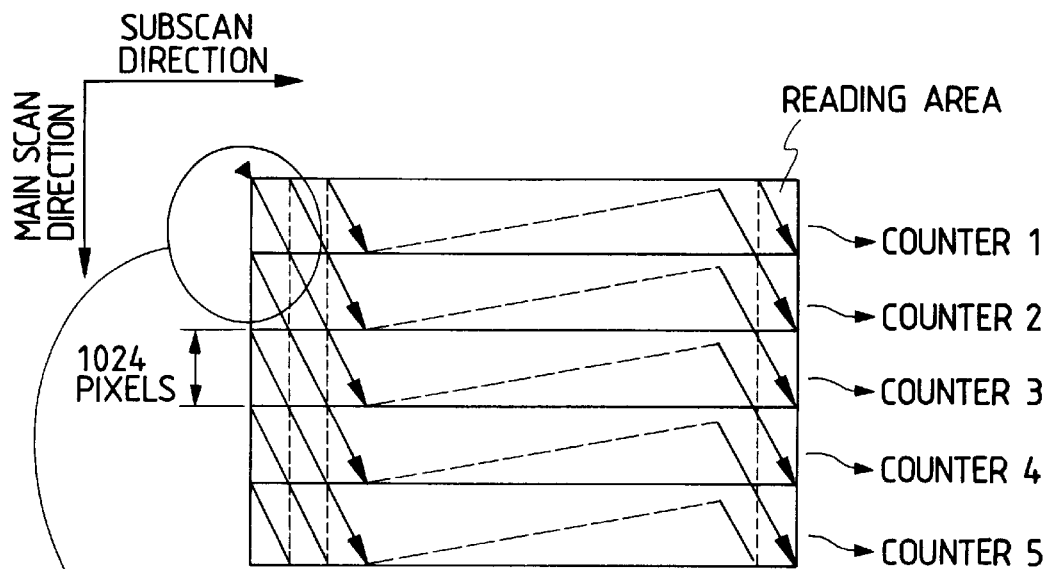
Figures 2, 30:
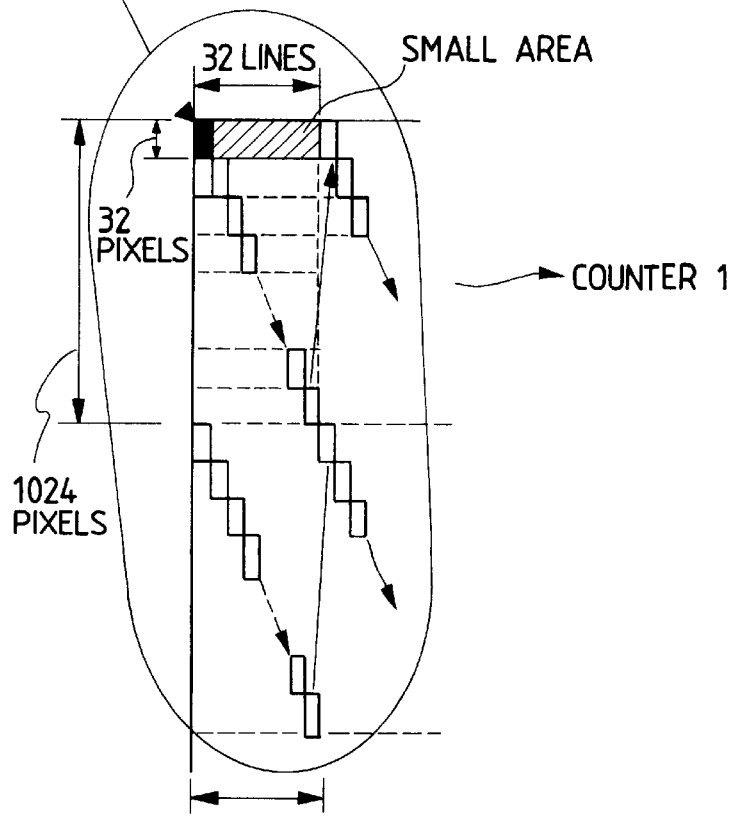

FIG. 30 shows the concept of said tenth embodiment.

In the present tenth embodiment, as shown in FIG. 30-1, the entire reading area is divided in the main scanning direction (containing about 5,000 pixels), for example into five strip zones of 1,024 pixels each, and a set of color determination counters is provided for each of said strip zones.

In the present embodiment, for a resolution of 400 dpi and a maximum readable size of A3, the main canning line contains 4,677 pixels, so that there can be employed 5 counters. The structure of said counters is same as that shown in FIG. 25, and will not, therefore, be explained further.

In each of said five strip zones, the sampling is conducted diagonally as shown in FIG. 30-1. FIG. 30-2 shows the mode of said sampling in a magnified partial view.

A black rectangle, having a width of 32 pixels in the main scanning direction and a width of a line in the sub scanning direction, indicates a sampling section to be counted by the counter 1. Said sampling section moves by 32 pixels in the main scanning direction as it moves by a line in the sub scanning direction, so that the width of 1024 pixels is covered in the samplings of 32 lines. Thus, at the thirty-third line, the first 32 pixels in the main scanning direction are sampled.

This sampling operation is executed in parallel manner by five counters, respectively in five strip zones. If the count obtained in a section of 32 pixels×1 line is larger than a predetermined count, a small area of about 2 mm square consisting of 32 pixels×32 lines, including said section of 32 pixels×1 line, is identified as a colored area.

Stated differently, the result of determination obtained from the black section shown in FIG. 30-2 serves as the representative value for the hatched small area of 32 pixels× 32 lines. The result of determination of 1 bit, obtained from each small area of about 2 mm square, amounts to information of about 4 Kbytes for the entire A3-size, a practically acceptable amount of information.

Figures 1, 31:
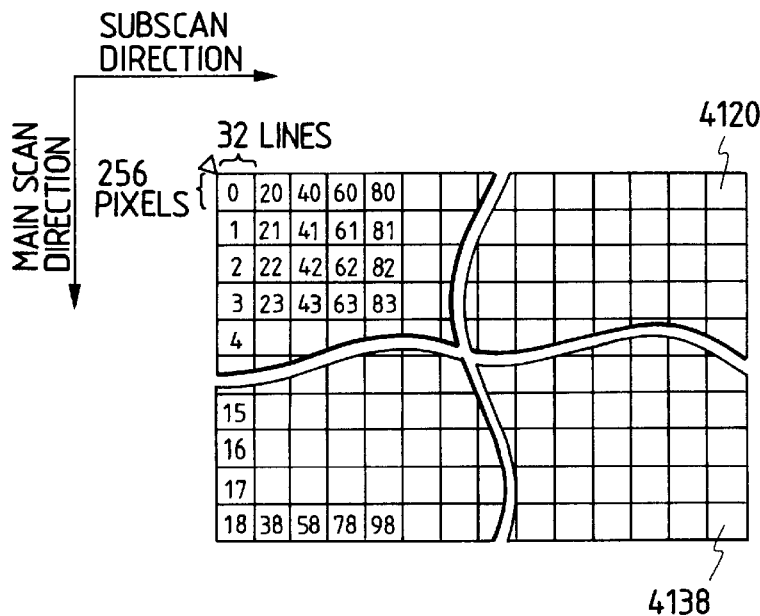
Figures 3, 31:
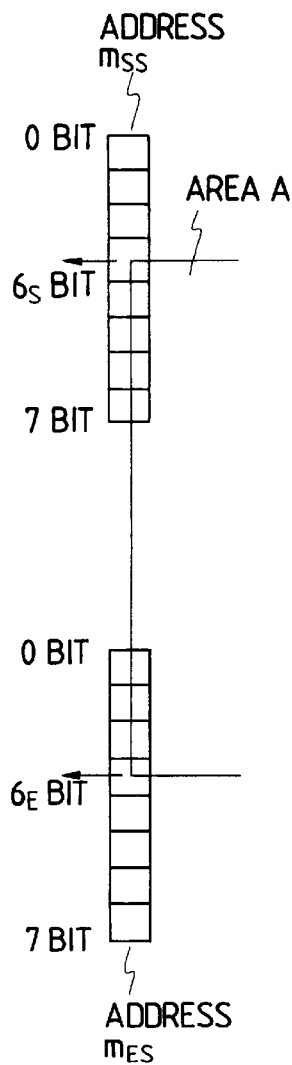
Figures 2, 31:
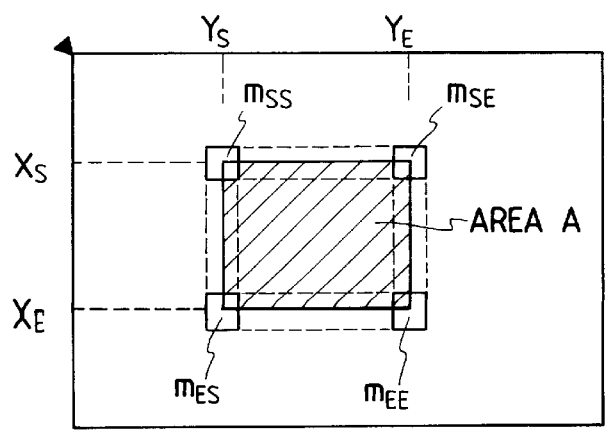

In the present embodiment, the results of determination of 32 lines in the sub scanning direction and 256 pixels in the main scanning direction, namely of 8 small areas consecutive in the main scanning direction, are stored in one byte, in which a lower bit corresponds to a small area closer to the reference point in the main scanning direction. FIG. 31-1 shows the relation between the RAM areas storing the results of determination and the small areas read. Each square indicates one-byte data representing the results of determination corresponding to 8 small areas, and the numeral in each square is the RAM address. The RAM shown in FIG. 31-1 is hereinafter called determination result map. Now, let us consider a case that an area A shown in FIG. 31-2 is designated after the map is completed.

By representing the coordinates XS, XE by pixels and the coordinates YS, YE by lines, the map addresses $m_{SS}$, $m_{SE}$, $m_{ES}$ and $m_{EE}$ corresponding to the squares at four corners of the area A can be defined by:

$$m_{SS} = \left[\frac{YS}{32}\right] \times 20 + \left[\frac{XS}{256}\right]$$

$$m_{SE} = \left[\frac{YE}{32}\right] \times 20 + \left[\frac{XS}{256}\right]$$

$$m_{ES} = \left[\frac{YS}{32}\right] \times 20 + \left[\frac{XE}{256}\right]$$

$$m_{EE} = \left[\frac{YE}{32}\right] \times 20 + \left[\frac{XE}{256}\right]$$

wherein [d/c] is a largest integer smaller than d/c.

Also since each square contains the results on 8 small areas arranged in the main scanning direction, the determination is conducted, as shown in FIG. 31-3, for each of the map addresses including the upper edge of the area from $m_{SS}$ to $m_{SE}$, on the $b_S$-th and higher bits, and, for each of the map addresses including the lower edge of the area, on the $b_E$-th and lower bits.

As will be apparent from FIG. 32-3, $$b_S = \left\{\frac{[XS/32]}{8}\right\}$$

$$b_E = \left\{\frac{[XE/32]}{8}\right\}$$

wherein [d/c] is the remainder of division d/c.

Therefore, the results of determination are checked on the map, from the $b_S$-th bit to 7th bit for address $m_{SS}$, then all the bits for addresses from $m_{SS}$+1 to $m_{ES}$−1, and from the 0-th bit to $b_E$-th bit for address $m_{ES}$; then from the $b_S$-th bit to 7th bit for address $m_{SS}$ +20, then all the bits for addresses from $m_{SS}$+21 to $m_{ES}$+19, and from the 0-th bit to $b_E$-th bit for address $m_{ES}$+20; thereafter on similar bits in the sub-scanning direction; and finally from the $b_S$-th bit to seventh bit for address $m_{SE}$, then all the bits for addresses from $m_{SE}$+1 to $m_{EE}$−1, and from the 0-th bit to $b_E$-th bit for address $m_{EE}$, and the areas A is identified as a color area if the number of bits "1" exceeds a predetermined number.

The fourth to tenth embodiments relate to the black-and-white/color determination of an area to be copied, but the concept thereof is applicable to the detection of any characteristic amount of the original, like the first to third embodiments.

For example, it is possible to detect the maximum and minimum densities from the structure shown in FIG. 13, to prepare an optimum density transformation curve from the histogram obtained from the detected maximum and minimum densities, and to apply such curve to the density transformation unit 107 shown in FIG. 1.

As explained in the foregoing, reductions in process time and in running cost are rendered possible by determining each of plural areas in an original whether it is a color area or a black-and-white area.

The present invention has been explained by certain preferred embodiments thereof, but it is not limited to such embodiments and is naturally subject to various modifications and alterations within the scope and spirit of the appended claims.

What is claimed is:

1. A color image processing apparatus comprising:

input means for inputting image data corresponding to a predetermined area, wherein said predetermined area includes a portion where an original exists and a portion where no original exists;

detection means for detecting a portion where an original exists in the predetermined area, based on the image data input by said input means;

first determination means for determining, based on an output of said detection means and the image data input by said input means, whether a pixel within the portion where the original exists is a color pixel or a monochromatic pixel, and for outputting a determination result;

second determination means for determining, based on a plurality of determination results of said first determination means, whether said original is a color original or a monochromatic original; and process means for performing a color process on said original in the case that said second determination means determines that said original is a color original and for performing a monochromatic process on said original in the case that said second determination means determines that said original is a monochromatic original.

2. A color image processing apparatus according to claim 1, wherein said first determination means is adapted to effect said determining operation parallel to the detection of a portion where the original exists by said detection means.

3. A color image processing apparatus according to claim 1, further comprising scanning means for scanning said original line by line.

4. A color image processing apparatus according to claim 3, wherein said detection means is adapted to effect a detecting operation line by line based on the scanning output of said scanning means.

5. A color image processing apparatus according to claim 3, wherein said first determination means is adapted to effect a determining operation line by line based on the scanning output of said scanning means.

6. A color image processing apparatus according to claim 1, wherein said process means is adapted to reproduce an image of the original.

7. A color image processing apparatus according to claim 6, wherein said process means is adapted to vary a reproducing operation, based on the result of determination of said second determination means.

8. A color image processing apparatus comprising:

scanning means for scanning an original image to generate image data corresponding to a predetermined area, wherein said predetermined area includes a portion where an original exists and a portion where no original exists;

detection means for detecting a portion where an original exists in the predetermined area, based on the image data generated by said scanning means;

first determination means for determining, based on the output of said detection means and the image data generated by said scanning means, whether a pixel within the portion where the original exists is a color pixel or a monochromatic pixel, and for outputting a determination result; and second determination means for determining, based on a plurality of determination results of said first determination means, whether said original is a color original or a monochromatic original; and process means for performing a color process on said original in the case that said second determination means determines that said original is a color original and for performing a monochromatic process on said original when said second determination means determines that said original is a monochromatic original;

wherein said detection means is adapted to effect the detecting operation based on a first scanning by said scanning means, and said first and second determination means are adapted to effect the determining operation based on a second scanning succeeding the first scanning.

9. A color image processing apparatus according to claim 8, further comprising scanning means comprising a CCD sensor.

10. A color image processing apparatus according to claim 9, wherein said first determination means is adapted to effect a determining operation line by line.

11. A color image processing apparatus according to claim 8, wherein said process means is adapted to reproduce an image of the original.

12. A color image processing apparatus according to claim 11, wherein said process means is adapted to vary a reproducing operation, based on the result of determination of said second determination means.

13. A color image processing apparatus comprising:

first data producing means for producing a first reproduction data for forming a first image onto a first image forming medium based on a first image data;

second data producing means for producing a second reproduction data for forming a second image onto a second image forming medium, different from the first image forming medium, based on a second image data, wherein the first and second images are not formed on the same image forming medium;

input means for inputting the first and the second image data;

detecting means for detecting whether each of the first and the second images is a color image or a monochromatic image, in accordance with a value associated with a pixel of the first image data and the second image data, respectively, and generating a corresponding output; and process means for processing the first and the second image data in accordance with the output generated by said detecting means, wherein the first and the second image data are obtained from a plurality of images supported by an original supporting means at a same time.

14. A color image processing apparatus according to claim 13, further comprising scanning means for scanning an original supported by the original supporting means and for generating the first and the second image data.

15. A color image processing apparatus according to claim 13, wherein said detecting means is adapted to effect a detecting operation based on the first and the second image data.

16. A color image processing apparatus according to claim 13, wherein said detecting means is adapted to effect a detecting operation sequentially for each of the first and the second images.

17. A color image processing apparatus according to claim 16, wherein said process means is adapted to vary an image forming operation of an image forming means, based on the output result of said detecting means.

18. A color image processing apparatus comprising:

reading means for effecting motion relative to an original, and for reading the original to generate an image data;

detecting means for detecting whether the original is a color image or a monochromatic image, in accordance with a value associated with a pixel of the image data generated by said reading means, and generating a corresponding output; and process means for processing the image of the original in accordance with the output generated by said detecting means;

wherein said reading means is adapted to terminate the relative motion in relation to the original for supplying said detecting means with the image data in response to the image of the original being detected to be a color image by said detecting means, without requiring reading of the entire area of the original.

19. A color image processing apparatus according to claim 18, wherein said reading means comprises a CCD sensor.

20. A color image processing apparatus according to claim 18, wherein said process means is adapted to reproduce the image of the original onto an image forming medium.

21. A color image processing apparatus according to claim 20, wherein said process means is adapted to vary a reproducing operation, based on the output of said detecting means.

22. A color image processing apparatus comprising:

first data producing means for producing a first reproduction data for forming a first image onto a first image forming medium based on a first image data;

second data producing means for producing a second reproduction data for forming a second image onto a second image forming medium, different from the first image forming medium, based on a second image data, wherein the first and second images are not formed on the same image forming medium;

input means for inputting the first and the second image data;

detecting means for detecting a property of the first and the second images, in accordance with a value associated with a pixel of the first image data and the second image data, respectively, and generating a corresponding output; and process means for processing the first and the second image data in accordance with the output generated by said detecting means, wherein the first and the second image data are obtained from a plurality of images supported by an original supporting means at a same time.

23. A color image processing apparatus according to claim 22, further comprising scanning means for scanning an original supported by the original supporting means and for generating the first and the second image data.

24. A color image processing apparatus according to claim 22, wherein said detecting means is adapted to effect a detecting operation based on the first and the second image data.

25. A color image processing apparatus according to claim 22, wherein said detecting means is adapted to effect a detecting operation sequentially for each of the first and the second images.

26. A color image processing apparatus according to claim 25, wherein said process means is adapted to vary an image forming operation of an image forming means, based on the output of said detecting means.

* * * * *

UNITED STATES PATENT AND TRADEMARK OFFICE
CERTIFICATE OF CORRECTION

PATENT NO. : 5,973,804           Page 1 of 2

DATED : October 26, 1999

INVENTOR : Masanori Yamada

It is certified that error appears in the above-identified patent and that said Letters Patent is hereby corrected as shown below:

COVER PAGE

Under [63] Related U.S. Application Data, "Continuation-in-part" should read --Continuation--.

Under [56] References Cited, Foreign Patent Documents,
"01236770" should read -- 1-236770 --;
"01277230" should read -- 1-277230 --; and
"01110677" should read -- 1-110677 --.

COLUMN 1

Line 5, "continuation-in-part" should be deleted.

COLUMN 6

Line 58, "a is" should read --$\alpha$ is the--.

COLUMN 7

Line 6, "6," should read --$\beta$--.

COLUMN 8

Line 14, "yi = yi$_{i+1}$" should read --y$_i$ = Y$_{i+1}$--.

COLUMN 12

Line 31, "value f" should read --value $\beta$--.

UNITED STATES PATENT AND TRADEMARK OFFICE
CERTIFICATE OF CORRECTION

PATENT NO. : 5,973,804          Page 2 of 2

DATED    : October 26, 1999

INVENTOR : Masanori Yamada

It is certified that error appears in the above-identified patent and that said Letters Patent is hereby corrected as shown below:

COLUMN 15

```
  Line 8,  "Said a" should read --Said α--;
  Line 14, "value S" should read --value β--; and
  Line 63, "AS," should read --XS,--.
```

COLUMN 19

```
  Line 44, "canning" should read --scanning--.
```

Signed and Sealed this

Eighth Day of August, 2000

Attest:

Q. TODD DICKINSON

Attesting Officer          Director of Patents and Trademarks